United States Patent
Booth et al.

(10) Patent No.: US 11,445,346 B2
(45) Date of Patent: *Sep. 13, 2022

(54) AUTONOMOUS SHARING OF DATA BETWEEN GEOGRAPHICALLY PROXIMATE NODES

(71) Applicant: Intel Corporation, Santa Clara, CA (US)

(72) Inventors: Cory J. Booth, Beaverton, OR (US); Adam Jordan, El Cerrito, CA (US); Michael Payne, Beaverton, OR (US); Alexandra C. Zafiroglu, Portland, OR (US); Joshua Ekandem, Rex, GA (US); Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,802

(22) Filed: Jun. 2, 2021

(65) Prior Publication Data

US 2021/0360375 A1 Nov. 18, 2021

Related U.S. Application Data

(62) Division of application No. 15/193,343, filed on Jun. 27, 2016, now Pat. No. 11,032,684.

(51) Int. Cl.
*H04W 4/70* (2018.01)
*H04W 4/80* (2018.01)
*H04L 45/00* (2022.01)

(52) U.S. Cl.
CPC ............... *H04W 4/70* (2018.02); *H04L 45/20* (2013.01); *H04W 4/80* (2018.02)

(58) Field of Classification Search
None
See application file for complete search history.

(56) References Cited

U.S. PATENT DOCUMENTS 6,549,513 B1 * 4/2003 Chao ................. H04L 45/00
370/227
7,251,256 B1 * 7/2007 Barry ................. H04J 3/0658
370/503

(Continued)

OTHER PUBLICATIONS

"U.S. Appl. No. 15/193,343, Non Final Office Action dated Feb. 21, 2020", 14 pgs.

(Continued)

*Primary Examiner* — Dhairya A Patel
(74) *Attorney, Agent, or Firm* — Schwegman Lundberg & Woessner, P.A.

(57) ABSTRACT

A communication system may include a plurality of geographically proximate nodes that communicate via one or more range-limited wireless technologies such as BLUETOOTH® low energy (BLE). An origin node may generate and communicate a first message responsive to detecting an event occurrence. The message may include an identifier associated with the origin node, data indicative of the event occurrence, a hop count, a maximum hop count, and a number of designated recipient nodes within the communication system. A first designated recipient node may, upon receiving the first message, attempt to confirm the event occurrence included in the first message. Upon confirming the event occurrence, the first designated recipient node may communicate a notification to an external third party. If unable to confirm the event occurrence, the first designated recipient node may generate and communicate a second message to a second designated recipient node included in the first message.

24 Claims, 14 Drawing Sheets

(56) References Cited

U.S. PATENT DOCUMENTS

| | | | |
|---|---|---|---|
| 9,549,282 B1 * | 1/2017 | McDonough | H04W 4/021 |
| 9,632,664 B2 * | 4/2017 | Foss | H04L 67/32 |
| 11,032,684 B2 | 6/2021 | Booth et al. | |
| 11,307,894 B1 * | 4/2022 | Jibaja | G06F 16/258 |
| 2007/0283005 A1 * | 12/2007 | Beliles | H04L 41/0816 |
| | | | 709/224 |
| 2010/0281312 A1 * | 11/2010 | Cohn | G06F 11/0757 |
| | | | 714/49 |
| 2010/0284414 A1 * | 11/2010 | Agarwal | H04L 49/351 |
| | | | 370/401 |
| 2014/0153444 A1 * | 6/2014 | Zhou | H04W 40/005 |
| | | | 370/256 |
| 2015/0019553 A1 * | 1/2015 | Shaashua | G06N 7/005 |
| | | | 707/737 |
| 2015/0222621 A1 * | 8/2015 | Baum | H04L 63/0807 |
| | | | 726/9 |
| 2016/0342906 A1 * | 11/2016 | Shaashua | H04L 67/12 |
| 2017/0243485 A1 * | 8/2017 | Rubin | H04W 4/12 |
| 2017/0374113 A1 * | 12/2017 | Booth | H04L 45/20 |
| 2022/0030066 A1 * | 1/2022 | Govindaraju | H04W 4/70 |
| 2022/0122204 A1 * | 4/2022 | Ghosh | H04W 4/12 |

OTHER PUBLICATIONS

"U.S. Appl. No. 15 193,343, Response filed May 21, 2020 to Non Final Office Action dated Feb. 21, 2020", 16 pgs.

"U.S. Appl. No. 15/193,343, Restriction Requirement dated Sep. 19, 2019", 6 pgs.

"U.S. Appl. No. 15/193,343, Response filed Oct. 30, 2019 to Restriction Requirement dated Sep. 19, 2019", 11 pgs.

"U.S. Appl. No. 15/193,343, Final Office Action dated Sep. 3, 2020", 15 pgs.

"U.S. Appl. No. 15/193,343, Response filed Dec. 2, 2020 to Final Office Action dated Sep. 3, 2020", 14 pgs.

"U.S. Appl. No. 15/193,343, Notice of Allowance dated Feb. 10, 2021", 19 pgs.

U.S. Appl. No. 15/193,343, filed Jun. 27, 2016, U.S. Pat. No. 11,032,684, Autonomous Sharing of Data Between Geographically Proximate Nodes.

* cited by examiner form of messages communicated between geographically proximate nodes, in accordance with at least one embodiment of the present disclosure;

AUTONOMOUS SHARING OF DATA BETWEEN GEOGRAPHICALLY PROXIMATE NODES

PRIORITY

This Application is a Division of U.S. patent application Ser. No. 15/193,343, filed Jun. 27, 2016, which is incorporated herein by reference in its entirety.

TECHNICAL FIELD

The present disclosure relates to limited range networking of communication systems between geographically proximate locations.

BACKGROUND

The availability of "smart" or Internet connected devices for use in the home continues to increase with time. Many suppliers of smart or Internet connected devices use proprietary or non-standard communications protocols that tend to confine data gathered by such devices within their vertical ecosystem. For example, a thermostat manufacturer or supplier may own the data generated by their smart or Internet connected thermostats installed within private homes. In another example, a cable or communications provider may own all or a portion of the data generated by IP cameras installed within private homes.

New entrants in the smart or Internet connected device market, such as Nest® and August Locks have attempted to change the paradigm in the home security, automation, and next generation smart home applications by enabling users to control and analyze the data provided by their devices. Providing such access to the data generated by smart and Internet connected devices is a first step in developing the Internet of things (IoT). The current architecture of individual smart home products and systems or vertical implementation of smart home solutions does not facilitate data sharing between homes within a geographic area (e.g., neighborhood, block, or similar) and with third parties such as police and/or emergency services. This invention provides the foundation for a new architecture that will drive new experiences, products and services given a smart home's physical and digital context within smart communities and smart cities.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
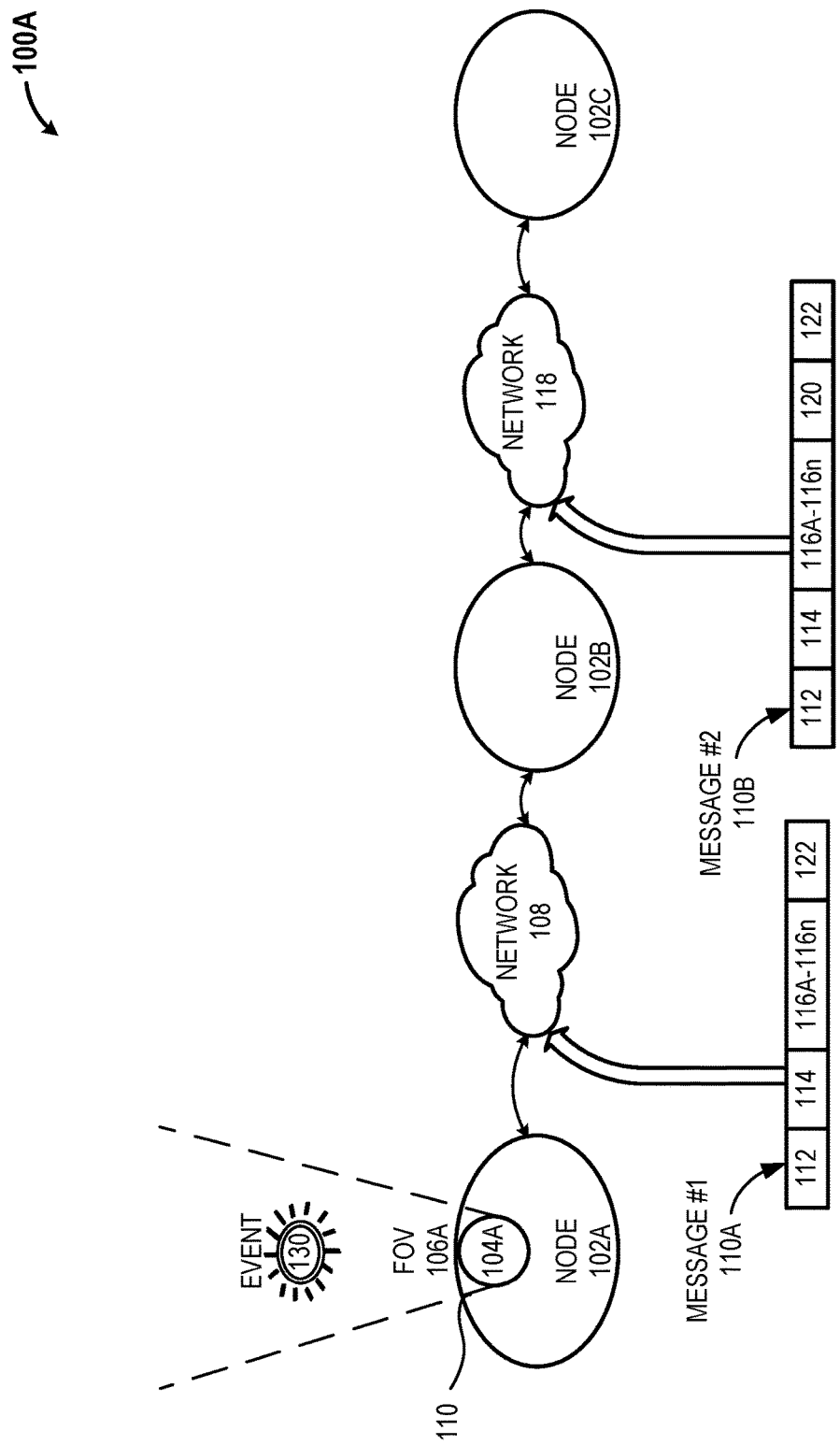
FIG. 1A provides a schematic diagram of an illustrative system for sharing information and/or data between geographically proximate nodes, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The systems and methods described herein generally enable the selective sharing of data generated by various home devices and services with designated geographically proximate homes, persons, or third parties. Such homes, persons, or third parties may each be considered a "node" within a defined network. Such selective sharing of data may occur on a unidirectional or bidirectional basis between the some or all of the "nodes" forming the network. Such sharing of data may include, but is not limited to, data transfers such as those described in the following illustrative examples:

1. Low latency, autonomous, sharing of home device and/or service data with one or more geographically proximate neighbors (i.e., "social sharing" with a personal "node");
2. Low latency, autonomous, sharing of home device and/or service data with one or more other transceivers located within one or more geographically proximate residences (i.e., "machine-to-machine sharing" with another geographically proximate residential transceivers); and
3. Low latency, autonomous, sharing of home device and/or service data with one or more third party entities which may (or may not) be geographically proximate the residences forming the network (i.e., "third party sharing" with commercial institutions, agencies, emergency responders, and similar service governmental and commercial service providers).

Communication between network nodes may be accomplished using one or more proprietary and/or standard communications protocols. Typically, such protocols should utilize transmitters having a range that is approximately equal to the expected average distance between the network nodes (e.g., the average distance between the least densely distributed networks—30 meters to 50 meters in a typical suburban residential neighborhood, or 10-15 meters in a typical urban multi-dwelling unit residential building). In one example, BLUETOOTH® low-energy (BLE) beaconing provides adequate range and may be used to convey information between network nodes. BLE beaconing may beneficially support machine-to-machine sharing. BLE beaconing may also satisfy the need to selectively communicate some data anonymously (e.g., when aggregating utility usage across a neighborhood to evaluate the need for infrastructure improvements) while communicating other data with one or more identifiers (e.g., when reporting a fire event at a node, communicating the address of the node where the event occurrence has been detected may assist in providing a prompt emergency response). Other current or future developed communications standards, protocols, and/or devices may be substituted to achieve a similar result to that discussed above using BLE beaconing.

The systems and methods disclosed herein beneficially provide the capability of selectively communicating information and data across the network. For example, each node within a 10 node network may be individually configurable by the property owner and/or system user by defining the following parameters:

1. Designating various message classes or levels—for example, low, medium, and high priority messages based on the specific threats posed by the event occurrence;
2. Designating various recipients within the network—for example, the user at node #1 may designate messages be communicated to nodes 2-5 and not be communicated to nodes 6-10. Recipients may also be designated based on the message level or class. For example, low priority messages may be communicated to nodes 2-5, medium priority to 2-4, and high priority to 2, 6, and 10.
3. Designating "do not accept" nodes within the network—for example, the user at node #8 may designate node #1 as a "do not accept" node such that even if the user at node #1 designates node #8 as a recipient, the transceiver at node #8 rejects all messages or, alternatively, receives only messages at or above a certain message priority level or class level (e.g., receives from node #1 only those messages designated as "high priority").

The systems and methods described herein also provide for anonymizing the shared information or data up to the point where additional specifics regarding the provenance of the information or data are needed (e.g., in an instance where a "fire event" is detected at a node within the network, the address corresponding to the node is needed to dispatch emergency services).

The systems and methods described herein enable user access and control of home device and/or service data and provide each user with the capability to selectively share the home device and/or service data with designated individuals (e.g., social sharing); with designated machines, transceivers, and/or nodes (e.g., machine-to-machine sharing); and with designated third parties such as police, fire, emergency medical services, insurance, and/or utilities (e.g., third party sharing). The systems and methods described herein provide for the selective sharing of anonymized home device and/or service data to a point where data provenance is needed to provide an appropriate response. Such systems and methods will beneficially and advantageously provide the infrastructure to support smart homes, smart communities, and smart cities.

A communication system is provided. The system may include a first designated recipient node communicably coupleable to an origin node included in a plurality of nodes. Each of the plurality of nodes may be logically associated with a respective geographic location. The first designated recipient node including: at least one wireless communications interface to receive a first message from an origin node, the first message including: data indicative of an event occurrence and data indicative of at least one designated recipient node; a configurable circuit communicably coupled to at least one wireless communications interface; The first designated recipient node may include a storage device communicably coupled to the configurable circuit, the storage device including machine readable instructions that transform the configurable circuit to a dedicated communications link control circuit that includes: event identification circuitry to determine an event occurrence type; event priority determination circuitry to determine a priority logically associated with the event occurrence; message generation circuitry to autonomously generate a second message that includes; event information provided by the origin node, data indicative of the event occurrence type; data indicative of the event occurrence priority; and data or information obtained by the first designated recipient node indicative of the event occurrence; and message transmission circuitry to autonomously, selectively, transmit the second message to at least a second designated recipient node.

Another communication system is provided. The communication system may include a plurality of nodes, each of the plurality of nodes logically associated with a geographic location and communicably coupled to at least one other of the remaining plurality of nodes. Each of the plurality of nodes may include at least one wireless communications interface; a configurable circuit communicably coupled to the at least one wireless communications interface; a storage device communicably coupled to the configurable circuit, the storage device including machine-readable instructions that transform the configurable circuit to a communications link control circuit that includes: event identification circuitry to determine an event occurrence type; event priority determination circuitry to determine a priority logically associated with the event occurrence; message generation circuitry to autonomously generate a second message that includes; event information provided by the origin node, data indicative of the event occurrence type; data indicative of the event occurrence priority; and data or information obtained by the first designated recipient node indicative of the event occurrence; and message transmission circuitry to autonomously, selectively, transmit the second message to at least a second designated recipient node.

A wireless communication method is provided. The wireless communication method may include receiving a first message from an origin node included in a plurality of nodes at a second node included in the plurality of nodes. The first message may include data indicative of an event occurrence remote from the first designated recipient node; data representative of a hop count; data representative of a maximum number of hops; data representative of at least one designated recipient node. The method may additionally include incrementing the hop count by the first designated recipient node; determining whether the hop count equals the maximum number of hops by the first designated recipient node; responsive to a determination that the hop count is less than the maximum number of hops: generating a second message at the first designated recipient node responsive to receipt of the first message. The second message may include data or information indicative of the event occurrence received from the origin node; data representative of an incremented hop count; data representative of the maximum hop count; and data representative of the at least one designated recipient node. The method may further include selectively transmitting the second message to at least a second designated recipient node.

Another wireless communication system is provided. The wireless communication system may include a means for receiving a first message from a first node included in a plurality of nodes at a second node included in the plurality of nodes. The first message may include data indicative of at least one of: an occurrence of a defined event or an environmental condition remote from at least the second node; data representative of a hop count; data representative of a maximum number of hops; data representative of at least one first designated recipient. The system may further include a means for incrementing the hop count by the second node; a means for determining whether the hop count equals the maximum number of hops by the second node; responsive to a determination that the hop count is less than the maximum number of hops: a means for generating a second message at the second node responsive to receipt of the first message. The second message may include data or information indicative of the occurrence of the defined event or the environmental condition remote from the second node; data representative of an incremented hop count; data representative of the maximum hop count; and data representative of at least one first designated recipient. The system may additionally include a means for selectively transmitting the second message to at least a first designated recipient.

A storage device that includes machine-readable instructions is provided. The machine-readable instructions, when executed by a configurable circuit, transform the configurable circuit to a communications link control circuit that: receives a first message from an origin node included in a plurality of nodes at a second node included in the plurality of nodes, the first message including: data indicative of an event occurrence remote from the first designated recipient node; data representative of a hop count; data representative of a maximum number of hops; data representative of at least one designated recipient node; increments the hop count by the first designated recipient node; determines whether the hop count equals the maximum number of hops by the first designated recipient node; responsive to a determination that the hop count is less than the maximum number of hops: generates a second message at the first designated recipient node responsive to receipt of the first message, the second message including: data or information indicative of the event occurrence received from the origin node; data representative of an incremented hop count; data representative of the maximum hop count; and data representative of the at least one designated recipient node; and selectively transmits the second message to at least a second designated recipient node.

As used herein, the terms "top," "bottom," "up," "down," "upward," "downward," "upwardly," "downwardly" and similar directional terms should be understood in their relative and not absolute sense. Thus, a component described as being "upwardly displaced" may be considered "laterally displaced" if the device carrying the component is rotated 90 degrees and may be considered "downwardly displaced" if the device carrying the component is inverted. Such implementations should be considered as included within the scope of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

FIG. 1A is a schematic diagram of an illustrative system 100A for sharing information and/or data between geographically proximate nodes 102A-102n (collectively, "nodes 102"), in accordance with at least one embodiment of the present disclosure. In embodiments, the nodes 102 may be disposed within a geographically proximate region or area 101, such as a community, development, neighborhood, subdivision, village, town, or city. Some or all of the nodes 102A-102n may include one or more sensors 104A-104n (collectively, "sensors 104"), each having a respective field-of-view 106A-106n (collectively "fields-of-view 106").

As depicted in FIG. 1A, an origin node 102A includes at least one sensor 104A having a field of view 106A. Sensor 104A is depicted in FIG. 1A as having a field-of-view 106A external to origin node 102A to detect a defined event occurrence 130 external to origin node 102A. However, at times, sensor 104A may have a field-of-view 106A that extends at least partially into the interior of origin node 102A to detect a defined event occurrence 130 inside of origin node 102A. In embodiments, some of the nodes 102 may include a portable device (smartphone, tablet computer, wearable computer, portable computer, laptop computer, netbook, etc.) carried by a designated individual recipient (i.e., social sharing). In embodiments, some of the nodes 102 may include a device in a fixed location (base station, desktop computer, router, etc.) positioned in a designated recipient location (i.e., machine-to-machine sharing). In embodiments, some of the nodes 102 may include a device in a commercial, institutional, or governmental location (i.e., third party sharing).

Sensors 104 may include any current or future developed system, device, component, or combination thereof capable of detecting the occurrence of one or more defined events 130. Sensors 104 may include one or more systems, devices, or components capable of providing a binary (HI/LO, ON/OFF, etc.) signal indicative of an event occurrence 130 to the origin node 102A. Non-limiting examples of sensors 104 capable of providing a binary signal indicative of an event occurrence 130 include: carbon monoxide monitors, smoke detectors, motion sensors, door contacts, and proximity sensors. Sensor 104 may include one or more systems, devices, or components capable of providing a signal that includes digital information or data indicative of an event occurrence 130 to the origin node 102A. Non-limiting examples of sensors 104 capable of providing digital information and/or data indicative of an event occurrence 130 may include: digital audio capture devices, digital video capture devices, or digital audio/visual capture devices.

Sensors 104 may include one or more systems, devices, or components capable of providing a signal that includes analog information and/or data indicative of an event occurrence 130 to the origin node 102A. In such instances, the signal(s) may be introduced to one or more analog-to-digital (A/D) converters for conversion to a digital signal. Non-limiting examples of sensors 104 capable of providing analog information and/or data indicative of an event occurrence 130 may include: analog audio capture devices; analog video capture devices, or analog audio/video capture devices.

Sensors 104 may include one or more controllers, processors, or processor circuits capable of receiving information and/or data representative of an object, an event, an environment, or combinations thereof existent within the field-of-view 106 of the respective sensor. In some instances, the sensors 104 may include signal processing capabilities. For example, a motion sensor 104 may detect motion of an object within the field-of-view 106 of the sensor and generate a binary output when an object meeting or exceeding defined size and movement thresholds occurs within the field-of-view 106 of the sensor 106. In another example, a smoke/carbon monoxide sensor 104 may detect a smoke/carbon monoxide event and may generate an analog or digital output that includes information and/or data representative of the detected smoke and/or carbon monoxide levels. The availability of such information or data may beneficially provide emergency responders with environmental condition information before reaching the origin node 102A. Although sensor 104A is associated with origin node 102A, it should be noted that the event occurrence 130 may occur at a proximate physical location that is either in, on, or about the origin node 102A or at a distal physical location that is remote from the origin node 102A but within the field-of-view 106A and detection range of the sensor 104A.

Upon detecting the defined event occurrence 130, node 102A generates and transmits a first message 110A to a first designated recipient 102B responsive to the event occurrence 130. The first message 110A may include one or more identifier data fields 112 that contain information and/or data indicative of an identifier or information that may be unique to origin node 102A (a street address, an IP address, a NIC address, a MAC address, etc.). The first message 110A may also include one or more event type data fields 114 that contain information and/or data indicative of a type, a class, or a specifics regarding the event occurrence 130 detected by sensor 104A. The first message 110A may additionally include one or more designated recipient data fields that contain data and/or information indicative of a number of designated recipients 116. In embodiments, the user and/or owner of node 102A may select any number of other nodes 102A-102n as designated recipients 116A-116n (collectively, "designated recipients 116"). Upon detecting the event occurrence 130, the first message 110A may be communicated to one or more designated recipients within range of origin node 102A. In embodiments, the first message 110A may include a serialized list of designated recipients 116A-116n. In some implementations, the messages 110 communicated between nodes 102 may be partially or completely encrypted. In some implementations, the messages 110 communicated between nodes 102 may include authentication information. In some implementations, the authentication information may be provided, in whole or in part, by the respective node 102 generating the message 110.

In some implementations, each message 110 may include one or more data fields 122 that contain information and/or data indicative of a priority value assigned by a node 102 based upon the perceived threat posed by the event occurrence 130. For example, the origin node 102A may assign a value corresponding to a "intermediate" level priority to a message 110A that contains information and/or data indicative of a potential fire event detected by a smoke sensor 104A. On the other hand, the origin node 102A may assign a value corresponding to a "high" level priority to a message 110A that contains information and/or data indicative of a potential fire event detected by a video capture device due to the threat to life and property posed by the open flame. Such priority may be assigned on a numeric and/or alphanumeric scale having sufficient resolution to accurately capture the priority of the event occurrence 130.

In some implementations, such priority levels may be escalated by subsequent designated recipient nodes 102B-102n based at least in part on sensor data 104B-104n obtained by the respective designated recipient node 102. For example, the origin node 102A may assign a value corresponding to a "intermediate" level priority to a message 110A that contains information and/or data indicative of a potential fire event detected by a smoke sensor 104A. Upon receiving the first message 110A, the first designated recipient node 102B may capture an image of an open flame proximate the origin node 102A using video capture sensor 104B. Responsive to capturing the image of the open flame, the first designated recipient node 102B may increase the priority level of the second message 110B communicated by the first designated recipient node 102B to a value corresponding to a "high" level priority.

As depicted in FIG. 1A, the first message 110A may be communicated from origin node 102A to the first designated recipient 116A at node 102B via a network 108. In some implementations, network 108 may include one or more local area networks (LANs), one or more wireless local area networks (WLANs), such as one or more IEEE 802.11 (WiFi®) compliant wireless networks. In other implementations, network 108 may include one or more personal area networks (PANs), such as one or more BLUETOOTH® wireless networks that link origin node 102A to the first designated recipient node 102B.

Upon receiving the first message 110A, the first designated recipient node 102B may add, amend, or append additional information and/or data to the first message 110A. In embodiments, such information and/or data may be added, amended, or appended to one or more recipient node data fields 120 included in the second message 110B. The second message 110B may include the one or more identifier data fields 112 that contain information and/or data indicative of an identifier or information that uniquely identifies origin node 102A. The second message 110B may also include the one or more event type data fields 114 that contain information and/or data indicative of the type, the class, or the specifics regarding the event occurrence 130 detected by sensor 104A.

As depicted in FIG. 1A, the second message 110B may be communicated from the first designated recipient node 102B to the second designated recipient node 102C via a network 118. Importantly, the messages 110 may be transmitted between nodes 102 with very low latency attributable, at least in part, to the direct communication between proximate nodes. In some implementations, network 118 may include one or more local area networks (LANs), one or more wireless local area networks (WLANs), such as one or more IEEE 802.11 (WiFi®) compliant wireless networks. In other implementations, network 118 may include one or more personal area networks (PANs), such as one or more BLUETOOTH® wireless networks that link the first designated recipient node 102B to the second designated recipient node 102C.

The event occurrence 130 may include any number of events, the occurrence of which is detectable using the one or more sensors 104.

Figure 1B:
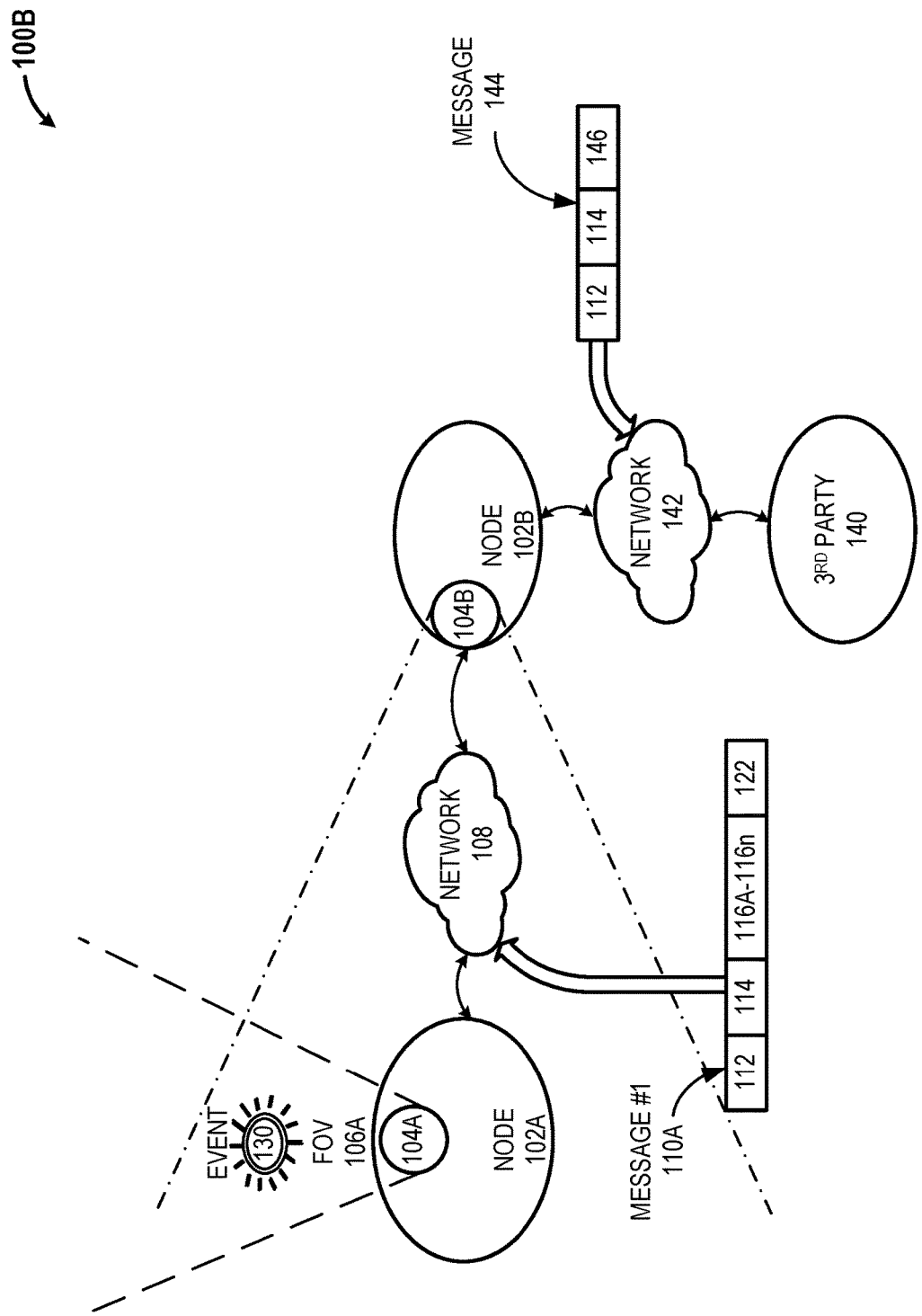
FIG. 1B provides a schematic diagram of an illustrative system for autonomous sharing of data and/or information between geographically proximate nodes and an external third party, in accordance with at least one embodiment of the present disclosure.

FIG. 1B is a schematic diagram of an illustrative system 100B for autonomous sharing of data and/or information between geographically proximate nodes 102 and an external third party 140, in accordance with at least one embodiment of the present disclosure. As depicted in FIG. 1B, in some instances, the first designated recipient node 102B may include a sensor 104B having a field-of-view 106B that at least partially encompasses or includes the origin node 102A. In such instances, upon receipt of the first message 110A from the origin node 102A, sensor 104B may be used to confirm or otherwise correlate the event occurrence 130 initially detected by sensor 104A at the origin node 102A. In some instances, the event occurrence 130 may be detected at the origin node 102A using a first type of sensor 104A and may be confirmed or correlated by the first designated recipient node 102B using either the same type or a different type of sensor 104B. For example, a fire event occurrence 130 may be detected at the origin node 102A using a smoke detector sensor 104A and may be confirmed or correlated by the first designated recipient node 102B using either a smoke detector sensor 104B (i.e., the same type of sensor) or a thermal imaging sensor 104B (i.e., a different type of sensor).

In response to a successful confirmation or correlation of the event occurrence 130, the first designated recipient node 102B may generate a message 144 for transmission to the external third party 140 via one or more networks 142. In embodiments, the message 144 may include the one or more identifier data fields 112 and one or more event type data fields 114 from the first message 110A. The message 144 may additionally include one or more sensor data fields 146 that contain information and/or data collected by sensor 104A and/or sensor 104B. In some implementations, the sensor data included with message 144 may assist an external third party recipient 140 in assessing the severity of the event occurrence 130 and may assist in determining the appropriate personnel and/or resources to address and/or remediate the event occurrence 130. In embodiments, the content of the message 144 may be partially or completely encrypted.

The one or more networks 142 may include one or more local area networks (LANs), one or more wireless LANs, one or more wide area networks, one or more metropolitan area networks (MANs), one or more worldwide networks (WWANs), one or more telephone networks, or any combination thereof. In some implementations, the external third party 140 may include one or more entities external to the geographic area 101 occupied by the nodes 102. For example, the external third party 140 may include one or more metropolitan emergency response agencies (e.g., fire or police) and the message 144 may include sensor data indicative of an event occurrence such as a fire at the origin node 102A. Thus, while communications between nodes 102 may using a device-to-device communication protocol (e.g., BLE), communication with the external third party 140 may occur using a different communication protocol (e.g., IEEE 802.3, IEEE 802.11, TCP/IP).

Figure 1C:
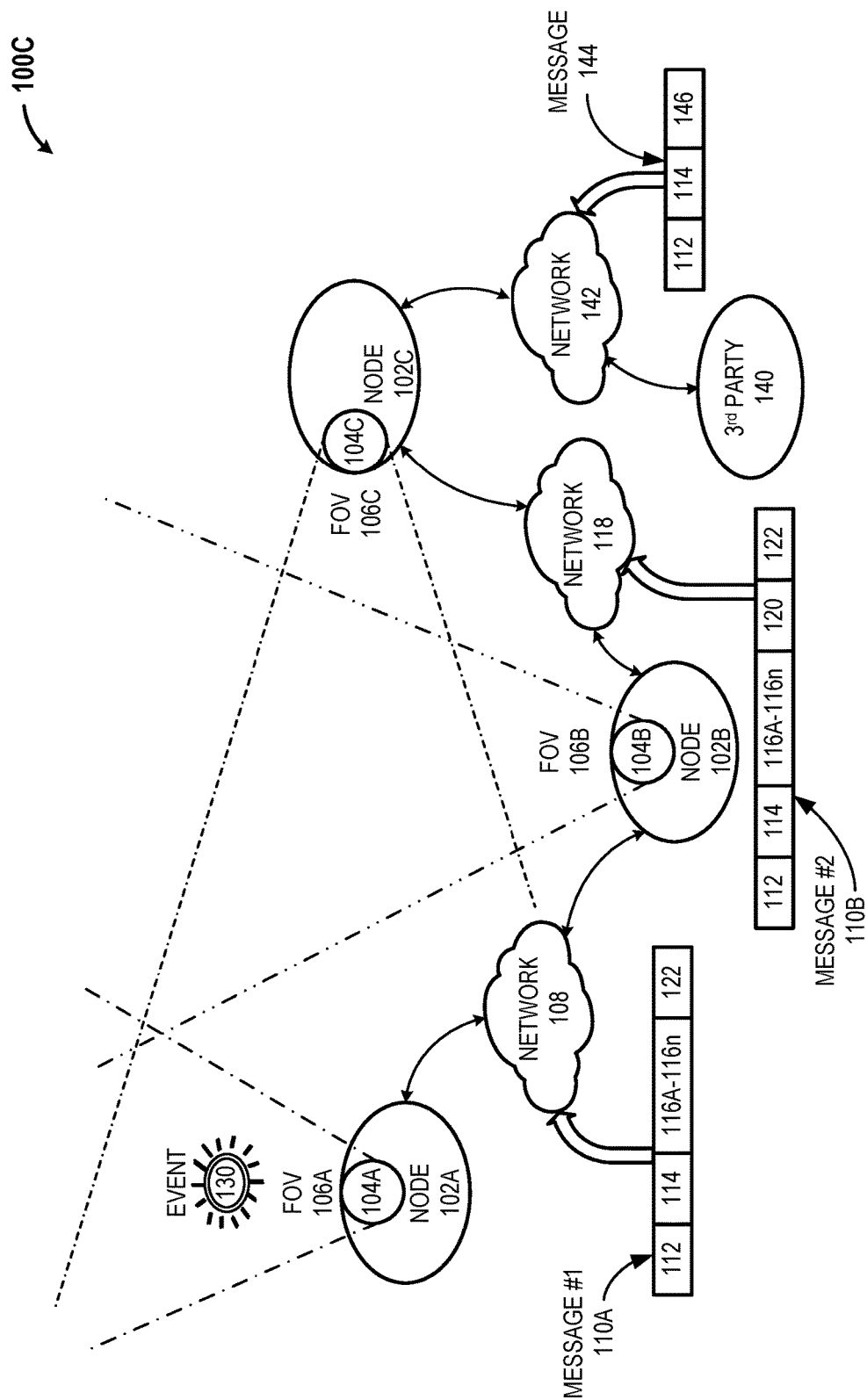
FIG. 1C provides a schematic diagram of an illustrative system for autonomous sharing of data and/or information between any number of geographically proximate nodes and at least one external third party, in accordance with at least one embodiment of the present disclosure.

FIG. 1C is a schematic diagram of an illustrative system 100C for autonomous sharing of data and/or information between any number of geographically proximate nodes 102 and at least one external third party 140, in accordance with at least one embodiment of the present disclosure. In some implementations, the first message 110A received by the first designated recipient node 102B may include a number of designated recipients 116A-116n. In such implementations, the first designated recipient node 102B may generate a second message 110B for transmission to the second designated recipient node 102C.

As depicted in FIG. 1C the first designated recipient node 102B may include a sensor 104B having a field-of-view 106B that does not encompass or include the event occurrence 130. On the other hand, the second designated recipient node 102C may include a sensor 104C having a field-of-view 106C that does encompass or otherwise include the event occurrence 130. In such instances, upon receipt of the first message 110A from the origin node 102A, the first designated recipient node 102B is unable to confirm or correlate the event occurrence 130 and generates the second message 110B for communication to the second designated recipient node 102C. The second message 110B may include the one or more identifier data fields 112, one or more event type data fields 114 and some or all of one or more designated recipient fields 116A-116n included in the first message 110A. The second message 110B may additionally include one or more recipient node data fields 120 that may contain information and/or data provided by the second designated recipient node 102B.

Upon receipt of the second message 110B, the second designated recipient node 102C sensor 104C may be used to confirm or otherwise correlate the event occurrence 130 initially detected by sensor 104A at the origin node 102A. In some instances, the event occurrence 130 may be detected at the origin node 102A using a first type of sensor 104A and may be confirmed or correlated using sensor 104C disposed in, on, or about the second designated recipient node 102C. In some implementations, the sensor 104C used to confirm or correlate the event occurrence at the origin node 102A may be the same type of sensor as sensor 104A. For example, the event occurrence 130 may be a fire/smoke event and both sensor 104A and sensor 104C may be video acquisition or capture devices. In some implementations, the sensor 104C used to confirm or correlate the event occurrence at the origin node 102A may be a different type of sensor from sensor 104A. For example, the event occurrence 130 may include a fire/smoke event, sensor 104A may be a smoke/carbon monoxide sensor and sensor 104C may be video acquisition or capture device.

As depicted in FIG. 1C, in response to a successful confirmation or correlation of the event occurrence 130, the designated recipient node 102C may generate a message 144 for transmission to the external third party 140 via one or more networks 142. In embodiments, the message 144 may include the one or more identifier data fields 112 and one or more event type data fields 114 from the first message 110A. The message 144 may additionally include one or more data fields 146 that contain information and/or data collected by sensor 104A and/or sensor 104B. In some implementations, the sensor data included with message 144 may assist an external third party recipient 140 in assessing the severity of the event occurrence 130 and may assist in determining the appropriate personnel and/or resources to address and/or remediate the event occurrence 130.

Figure 2:
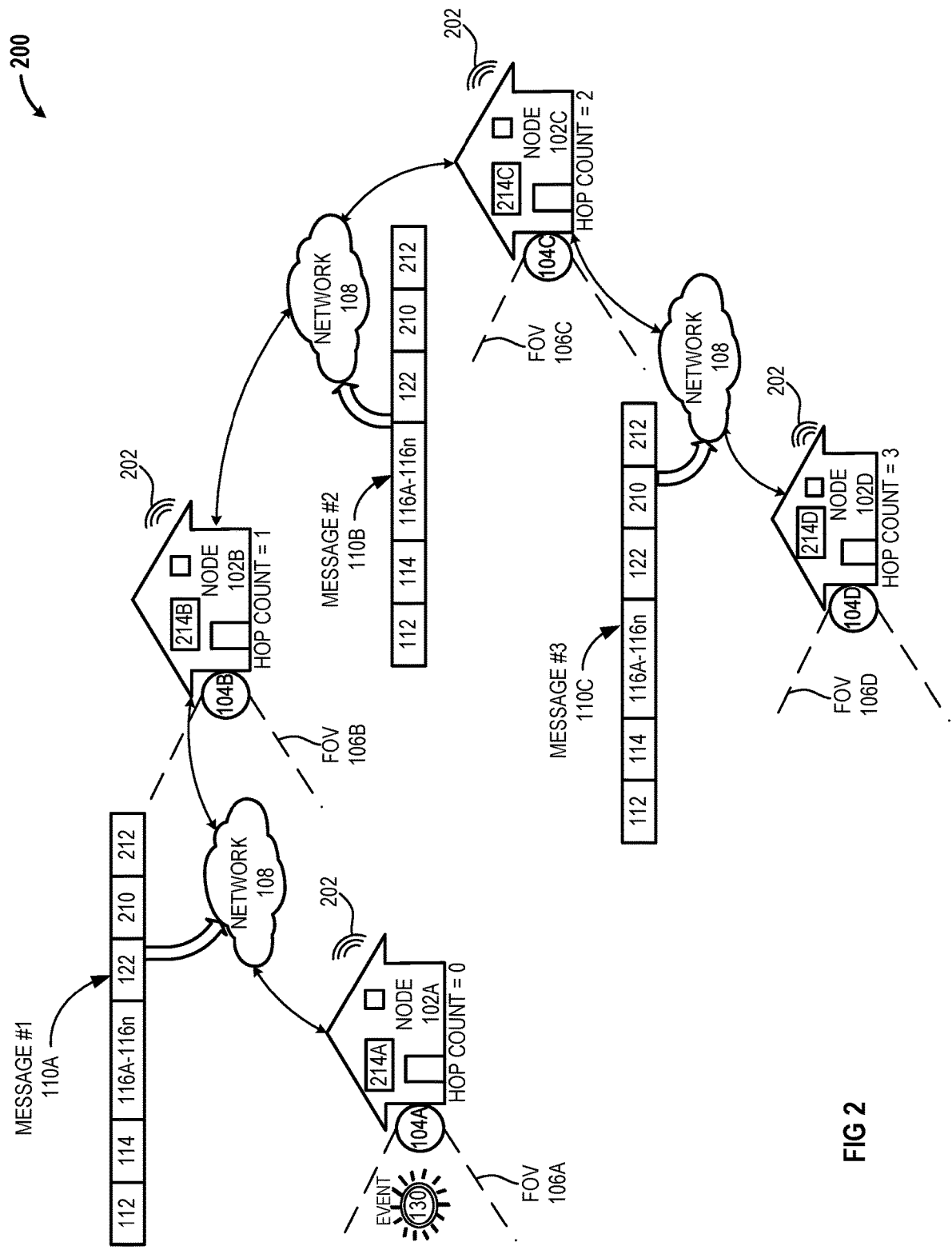
FIG. 2 provides a schematic diagram of another illustrative system for autonomous sharing of information and/or data between geographically proximate nodes in which a hop count between nodes is tracked, each message includes information and/or data indicative of a maximum number of permissible hops, and each message includes information and/or data indicative of a number of blocked nodes, in accordance with at least one embodiment of the present disclosure.

FIG. 2 is a schematic diagram of another illustrative system 200 for autonomous sharing of information and/or data between geographically proximate nodes 102 in which a hop count 210 between nodes 102 is tracked, each message 110 includes information and/or data indicative of a maximum number of permissible hops 212, and each message 110 includes information and/or data indicative of a number of blocked nodes 230, in accordance with at least one embodiment of the present disclosure. In addition to containing one or more origin node data fields 112, one or more event type data fields 114, and one or more designated recipient fields 116A-116n, each message communicated between nodes 102 may also include one or more hop count data fields 210, and one or more maximum hops data field 212.

In addition, each of the nodes 102A-102n may include information and/or data 214A-214n indicative of "blocked nodes" 102 from which messages 110 will not be accepted (collectively, "blocked node data 214"). In some implementations, such blocked node data 214 may block messages 110 originating from designated nodes 102 based on the priority level assigned to the message by the origin node 102A. For example, node 102C may selectively block some or all messages 110 from node 102B unless the message 110 is assigned a priority that exceeds a predetermined threshold value.

Upon detecting an event occurrence 130, origin node 102A wirelessly transmits 202 the first message 110A to the first designated recipient node 102B. In some implementations, the origin node 102A may wirelessly transmit 202 the first message 110A by broadcasting the first message 110A on a channel at a frequency that is receivable by other nodes 102 within a defined range of the origin node 102A. In one example, the origin node 102A may wirelessly transmit 202 the first message 110A using an advertising channel within the BLUETOOTH low energy (BLE) spectrum.

The BLE spectrum includes 37 data communication channels and 3 advertising channels that may be used for device discovery. In embodiments, a BLE advertising channel may be used to detect other nodes 102 which may include any number of personal nodes (e.g., smartphones) and/or any number of stationary nodes (e.g., desktops, routers) that are in-range of the origin node 102A. The advertising channel may carry the discovery and connection establishment information and/or data associated with the origin node 102A. In embodiments, once a connection between the origin node 102A and another node 102 is established, a BLE data channel Protocol Data Unit (PDU) may provide link control data and payload for higher level protocols. Other similar limited range and/or personal area network communications protocols including, but not limited to, IEEE 802.11 (WiFi®), IEEE 802.15.4 (ZigBee®), Z-Wave (Sigma Designs Inc., FREMONT, Calif.), wireless universal serial bus (USB), and Insteon (SmartLabs, Inc., IRVINE, Calif.) may also be used in addition to or as an alternative to BLE.

The first message 110A may include one or more hop count data fields 210 that contain information and/or data indicative of a hop count. The first message 110A may additionally include one or more maximum hop count data fields 212 that contain information and/or data indicative of a maximum number of hops. In embodiments, each subsequent designated recipient node 102 may increment by one (1) the value contained in the one or more hop count data fields 210. The designated recipient nodes 102 may continue to forward the message until the value contained in the one or more hop count data fields 210 equals the value contained in the one or more maximum hop count data fields 212. For example, as depicted in FIG. 2, the origin node 102A may generate a first message 110A in which the one or more maximum hop count data fields 212 contains a value of "3" (i.e., a maximum of three hops). The first designated recipient node 102B increases the value in the one or more hop count data fields 210 to a value of "1." The second designated recipient node 102C increases the value in the one or more hop count data fields 210 to a value of "2." The third designated recipient node 102D increases the value in the one or more hop count data fields 210 to a value of "3." Since the maximum hop count has been reached at the third designated recipient node 102D, the message 110 will no longer be forwarded.

Each node 102 may include a communicably coupled storage device that includes information and/or data representative of one or more blocked recipient data fields 214A-214D (collectively, "blocked recipient data fields 214"). For example, the owner, operator, or user of a node 102A may elect to not receive messages 110 from one or more blocked recipient nodes 102B-102n. In such instances, the one or more blocked recipient data fields 214 stored at node 102A may include data representative of the nodes blocked by the owner, operator, or user of node 102A. In such instances, node 102A may not forward or retransmit inbound messages from the one or more blocked recipient nodes 102B-102n. However, in situations where a priority exceeds a defined threshold level (e.g., event occurrences 130 which threaten public welfare and/or public safety, and/or event occurrences 130 which threaten life and/or property), node 102A may forward or retransmit inbound messages from the one or more blocked recipient nodes 102B-102n to additional designated recipient nodes 102 included in the one or more designated recipient fields 116A-116n included in the received inbound message 110.

Figure 3:
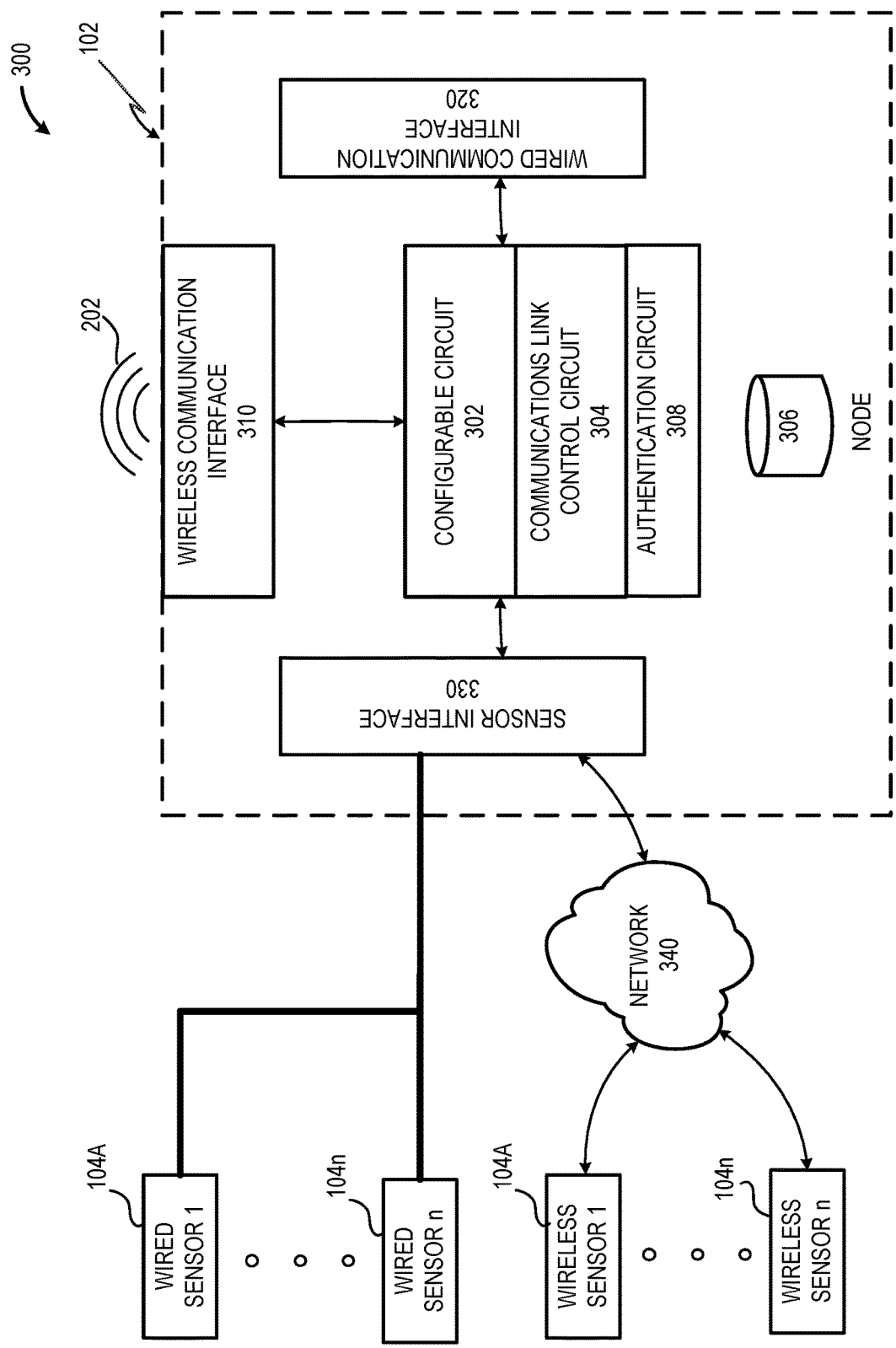
FIG. 3 provides a block diagram of an illustrative mobile, personal, or fixed node used within systems depicted in FIGS. 1A-1C and 2 for autonomous sharing of data between geographically proximate nodes, in accordance with at least one embodiment of the present disclosure.

FIG. 3 provides a block diagram of an illustrative mobile, personal, or fixed node 102 used within systems 100A, 100B, 100C, and 200 depicted in FIGS. 1A-1C and 2 for autonomous sharing of data between geographically proximate nodes 102, in accordance with at least one embodiment of the present disclosure. Each node 102 may include one or more configurable circuits 302, at least a portion of which may be transformed into a specialized, dedicated, and particular communications link control circuit 304 by executing one or more machine-readable instruction sets stored or otherwise retained in, on, or about one or more communicably coupled storage devices 306.

A number of wired sensors 104A-104n may communicably couple to the communications link control circuit 304 via one or more sensor interfaces 330. A number of wireless sensors 104A-104n may communicably couple to the communications link control circuit 304 via one or more networks 340 and the one or more sensor interfaces 330. In some implementations some or all of the wired sensors 104A-104n and/or some or all of the wireless sensors 104A-104n may be disposed proximate the node 102 or collocated in a common housing with the node 102. In some implementations some or all of the wired sensors 104A-104n and/or some or all of the wireless sensors 104A-104n may be disposed remote from the node 102.

Each node 102 may include one or more storage devices 306. In some implementations, the one or more storage devices 306 may be collocated with the node 102. In some implementations, the one or more storage devices 306 may be disposed remote from the node 102. The one or more storage devices 306 may include one or more fixed or removable storage devices. The one or more storage devices 306 may store or otherwise retain one or more machine-readable instruction sets for acquiring data from the one or more sensors 104 coupled to the node 102. The one or more storage devices 306 may store or otherwise retain one or more machine-readable instruction sets for analyzing the information and/or data included in the signal provided by each of the one or more sensors 104 coupled to the node 102. The one or more storage devices 306 may include one or more storage devices capable of storing or otherwise retaining machine-readable instructions for receiving messages 110 and forwarding messages 110 that include information and/or data received from the one or more sensors 104 coupled to the node 102.

Each node 102 may include one or more authentication circuits 308. The authentication circuit 308 may be used to validate or otherwise authenticate the first message 110A received from another node (e.g., the origin node 102A) in the plurality of nodes. Such validation and/or authentication may take the form of confirming data included in the first message matches one or more factory configured authentication or validation strings. The authentication circuit 308 may also generate, retrieve, or otherwise produce authentication data for inclusion in the second message 110B transmitted by the first designated recipient node 102B to the second designated recipient node 102C. In some implementations, the authentication circuit 308 may retrieve factory supplied authentication information and/or data that is stored or otherwise retained in a protected portion of the memory of the first designated recipient node 102B.

Each node 102 may include one or more wireless communication interfaces 310. The one or more wireless communication interfaces 310 may be used to wirelessly receive and/or transmit 202 messages 110 to one or more other nodes 102. In some implementations, the one or more wireless communication interfaces 310 may include, but are not limited to, one or more BLUETOOTH wireless interfaces, one or more IEEE 802.11 wireless interfaces, one or more IEEE 802.11 (WiFi®) interfaces, one or more IEEE 802.15.4 (ZigBee®) interfaces, one or more Z-Wave interfaces, one or more wireless universal serial bus (USB) interfaces, and/or one or more Insteon interfaces. In some implementations, the one or more wireless communication interfaces 310 may include one or more wireless or cellular telephone communication interfaces such as 3G, 4G, 5G, LTE, CDMA, CDM, or similar. In some implementations, the node 102 may communicably couple to the third party 140 via the one or more wireless communication interfaces 310. For example, the node 102 may communicably couple to the third party 140 via one or more cellular networks; one or more local area networks (LANs); one or more metropolitan area networks (MANs); one or more wide area networks (WANs); or one or more worldwide area networks (WWANs).

Each node 102 may include one or more wired communication interfaces 320. The one or more wired communication interfaces 320 may communicably couple the node 102 to the third party 140. In some implementations, the one or more wired communication interfaces 320 may include an IEEE 802.3 interface. In some implementations, the one or more wired communication interfaces 320 may include an RJ11 modular connector to communicably couple a conventional telephone to the node 102.

Figure 4:
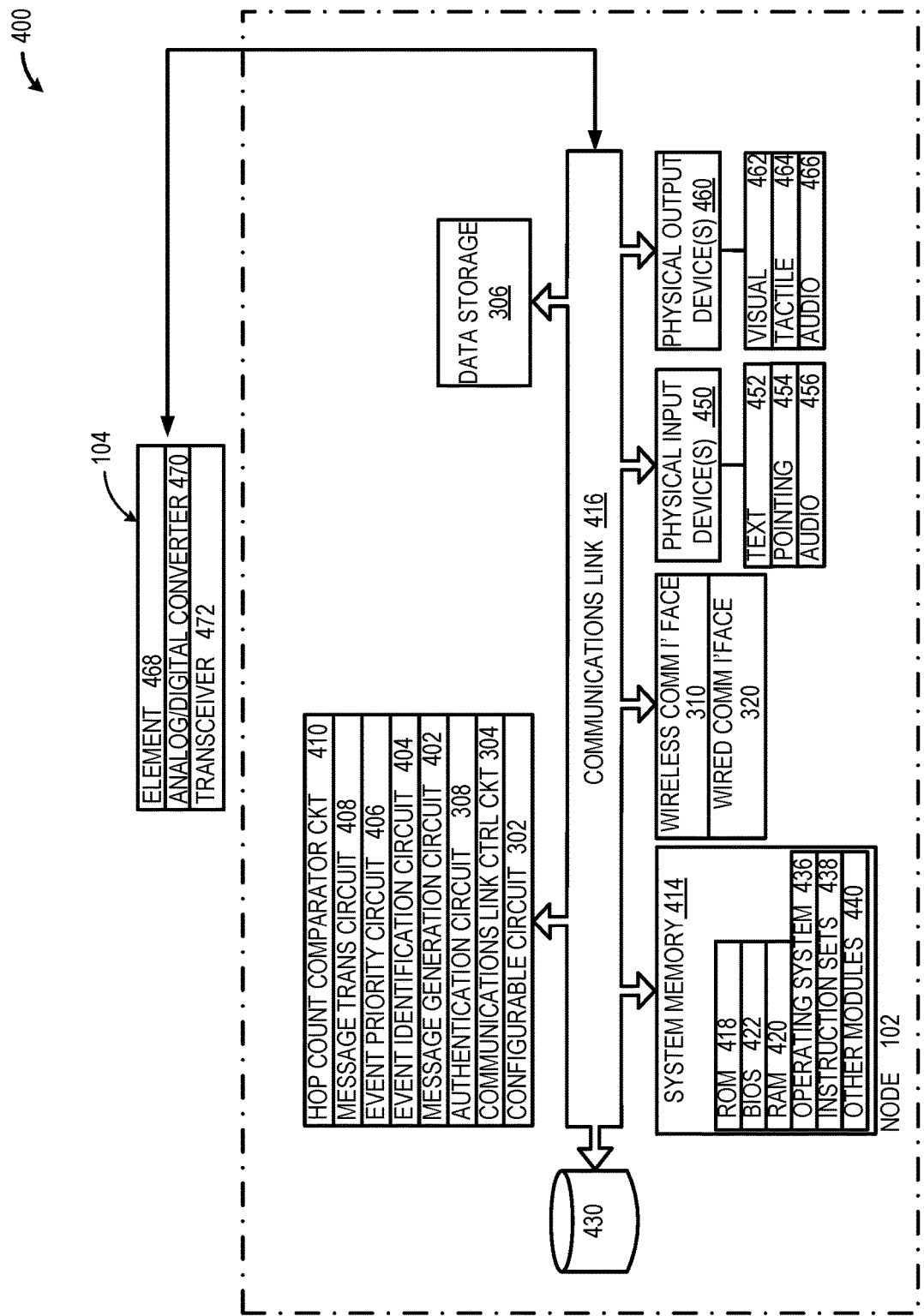
FIG. 4 provides an illustrative system that includes one or more configurable circuits capable of providing a communications link control circuitry, event identification circuitry, event priority determination circuitry, message generation circuitry, message transmission circuitry, and hop count comparator circuitry, in accordance with at least one embodiment of the present disclosure.

FIG. 4 and the following discussion provide a brief, general description of the components forming an illustrative system 400 that includes one or more configurable circuits 302 in which the communications link control circuit 304 may be implemented. Although not required, some portion of the embodiments will be described in the general context of machine-readable or computer-executable instruction sets, such as program application modules, objects, or macros being executed by the one or more configurable circuits 302. As depicted in FIG. 4, the communications link control circuit 304 may include various circuits or circuitry, such as sensor interface circuitry that forms at least a portion of the sensor interface 330, wireless communication interface circuitry that forms at least a portion of the wireless communication interface 310, wired communication interface circuitry that forms at least a portion of the wired communication interface 320. Such circuitry may be implemented in the form of hardwired circuits, programmable circuits, controllers, signal processors, processors, microprocessors, or combinations thereof.

Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The node 102 may include any number of configurable circuits 302, each of which may include a variety of electronic and/or semiconductor components that are disposed partially or wholly in a wearable computer, portable computing device, personal digital assistant, personal computer, or other similar current or future processor-based devices and/or systems capable of executing machine-readable instructions.

The number of configurable circuits 302 may be interconnected with, electrically coupled, and/or communicably coupled to various components within the node 102 via one or more communications links 416. As depicted in FIG. 4, system components such as a system memory 414 may be communicably coupled to each of the number of configurable circuits 302 via the one or more communications links 416. The node 102 may, at times, be referred to in the singular herein, but this is not intended to limit the embodiments to a single system, since in certain embodiments, there will be more than one node 102 or other networked systems, circuits, or devices involved. Also, as used herein, the term "node" may variously refer to a portable electronic device (e.g., smartphone, portable processor-based device, wearable processor-based device, Each of the number of configurable circuits 302 may include any number, type, or combination of conductors, insulators, electrical devices, and/or semiconductor components. At times, each of the number of configurable circuits 302, including all or a portion of the communications link control circuit 304, may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 4 are of conventional design. As a result, such blocks need not be described in further detail herein, as they will be understood by those skilled in the relevant art. The one or more communications links 416 that interconnects at least some of the components may employ any known serial or parallel bus structures or architectures.

In some implementations, the communications link control circuit 304 may include a number of circuits, subsystems, or similar structures. In such implementations, the communications link control circuit 304 may include event identification circuitry 404 to determine an event occurrence type that may be logically associated with the event occurrence 130. In at least some implementations, the event identification circuitry 404 may use data provided by one or more sensors 104 communicably coupled to the origin node 102A and/or the first designated recipient node 102B.

The communications link control circuit 304 may additionally include event priority determination circuitry 406 to determine a relative priority value that may be logically associated with the event occurrence 130. The relative priority value may be based at least on the severity of the event occurrence 130, the threat the event occurrence 130 poses to life and/or property, the potential remediation costs caused by the event occurrence 130; or combinations thereof. In at least some implementations, the event priority determination circuitry 406 may use data provided by one or more sensors 104 communicably coupled to the origin node 102A and/or the first designated recipient node 102B to assess the severity and/or risk posed by the event occurrence 130 prior to determining a relative priority value to logically associate with the event occurrence 130.

The communications link control circuit 304 may additionally include message generation circuitry 402 to generate a message 110 for transmission to another designated recipient node 116 included in the plurality of nodes 102. In some implementations, the message 110 generated by the message generation circuitry 406 may include information and/or data included in the first message 110A from the origin node 102A received by the first designated recipient node 102B. In some implementations, the message 110 generated by the message generation circuitry 406 may include information and/or data received from one or more sensors 104 communicably coupled to the first designated recipient node 102B. In some implementations, the message 110 generated by the message generation circuitry 406 may include data indicative of a hop count and/or data indicative of a maximum hop count.

The communications link control circuit 304 may additionally include message transmission circuitry 408 to communicate the message 110B generated by the message generation circuitry 402 to the second designated recipient node 102C. The communications link control circuit 304 may additionally include hop count comparator circuitry 410 to compare the hop count at the first designated recipient node 102B with the maximum hop count.

The system memory 414 may include read-only memory ("ROM") 418 and random access memory ("RAM") 420. A portion of the ROM 418 may contain a basic input/output system ("BIOS") 422. The BIOS 422 may provide basic functionality to the node 102, for example by causing at least some of the one or more configurable circuits 302 to load one or more machine-readable instruction sets that cause at least one of the one or more configurable circuits 302 to provide the communications link control circuit 304. The node 102 may include one or more communicably coupled, non-transitory, data storage devices 306. The one or more data storage devices 306 may include any number and/or combination of any current or future developed non-transitory storage devices. Non-limiting examples of such non-transitory, data storage devices 306 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

The one or more storage devices 306 may include interfaces or controllers (not shown) communicatively coupling the respective storage device(s) 306 to the one or more communications links 416, as is known by those skilled in the art. The one or more storage devices 306 may store, retain, or otherwise include a number of machine-readable instruction sets, data structures, program modules, and other data useful to the node 102. In some instances, one or more external storage devices 430 may be communicably coupled to the node 102. In one example, the one or more external storage devices 430 may include one or more remote server based storage devices or "cloud" storage devices that are bidirectionally communicably coupled to the node 102 via one or more wireless networks (e.g., IEEE 802.11 "Wi-Fi"), one or more wired networks (e.g., IEEE 802.3 "Ethernet"), or combinations thereof.

A number of sensors 104 may be communicably coupled to the communications link control circuit 304 via the one or more communications links 416. In at least some implementations, such sensors 104 may autonomously collect information and/or data indicative of one or more conditions existent within the node 102 or external to the node 102. In embodiments, each of the sensors 104 may include one or more analog-to-digital (A/D) and/or digital-to-analog (D/A) converters 470, and/or one or more transceivers 472.

Machine-readable instruction sets and/or applications 438 and housekeeping instruction sets 440 may be stored or otherwise retained in whole or in part in the system memory 414. Such instruction sets may be transferred from one or more data storage devices 306 and/or one or more external storage devices 430 and stored in the system memory 414 in whole or in part for execution by at least one of the one or more configurable circuits 302. The machine-readable instruction sets 438 may include instructions and/or logic that provide the capability to identify an event occurrence 130, generate one or more messages 110 that include information and/or data indicative of the origin node 102A, the event occurrence 130, and the designated recipient nodes 116A-116n.

For example, one or more machine-readable instruction sets 438 may cause the communications link control circuitry 304 to generate a message 110 that includes the one or more origin node data fields 112, one or more event type data fields 114, and one or more designated recipient fields 116A-116n, one or more hop count data fields 210, and one or more maximum hops data field 212. The one or more machine-readable instruction sets 438 may cause the communications link control circuitry 304 to analyze and/or assess the data provided by the sensor 104 to determine at least a priority level that is logically associated with the event occurrence 130. The one or more machine-readable instruction sets 438 may cause the communications link control circuitry 304 to determine one or more designated recipient nodes 116A-116n. In some instances, the one or more machine-readable instruction sets 338 may cause the communications link control circuitry 304 to determine one or more designated recipient nodes 116A-116n based, at least in part, on the type of event occurrence 130 and/or the priority associated with the event occurrence 130. The one or more more machine-readable instruction sets 438 may cause the communications link control circuitry 304 and/or the sensor 104 to confirm or correlate an event occurrence at another node 102 and perform one or more third party 140 notifications based on an confirmed or correlated event occurrence 130.

The node 102 may include one or more communicably coupled physical input devices 450, such as one or more text entry devices 452 (e.g., keyboard), one or more pointing devices 454 (e.g., mouse, trackball, touchscreen), and/or one or more audio input devices 456. Such physical input devices 450 may be used, for example, to provide, enter, or otherwise supply commands (e.g., acknowledgements, selections, confirmations, and similar) as well as information (e.g., acknowledgements, corrected subject identifiers, and similar) to the communications link control circuit 304.

The node 102 may include one or more communicably coupled physical output devices 460, such as one or more visual output devices 462 (e.g., a display device), one or more tactile output devices 464 (e.g., haptic feedback or similar), one or more audio output devices 466, or combinations thereof.

For convenience, the wireless communication interface 310, the wired communication interface 320, the one or more configurable circuits 302, the system memory 414, the physical input devices 450 and the physical output devices 460 are illustrated as communicatively coupled to each other via the one or more communications links 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In some embodiments, the one or more communications links 416 may be omitted and the components are coupled directly to each other using suitable wired or wireless connections.

Figure 5:
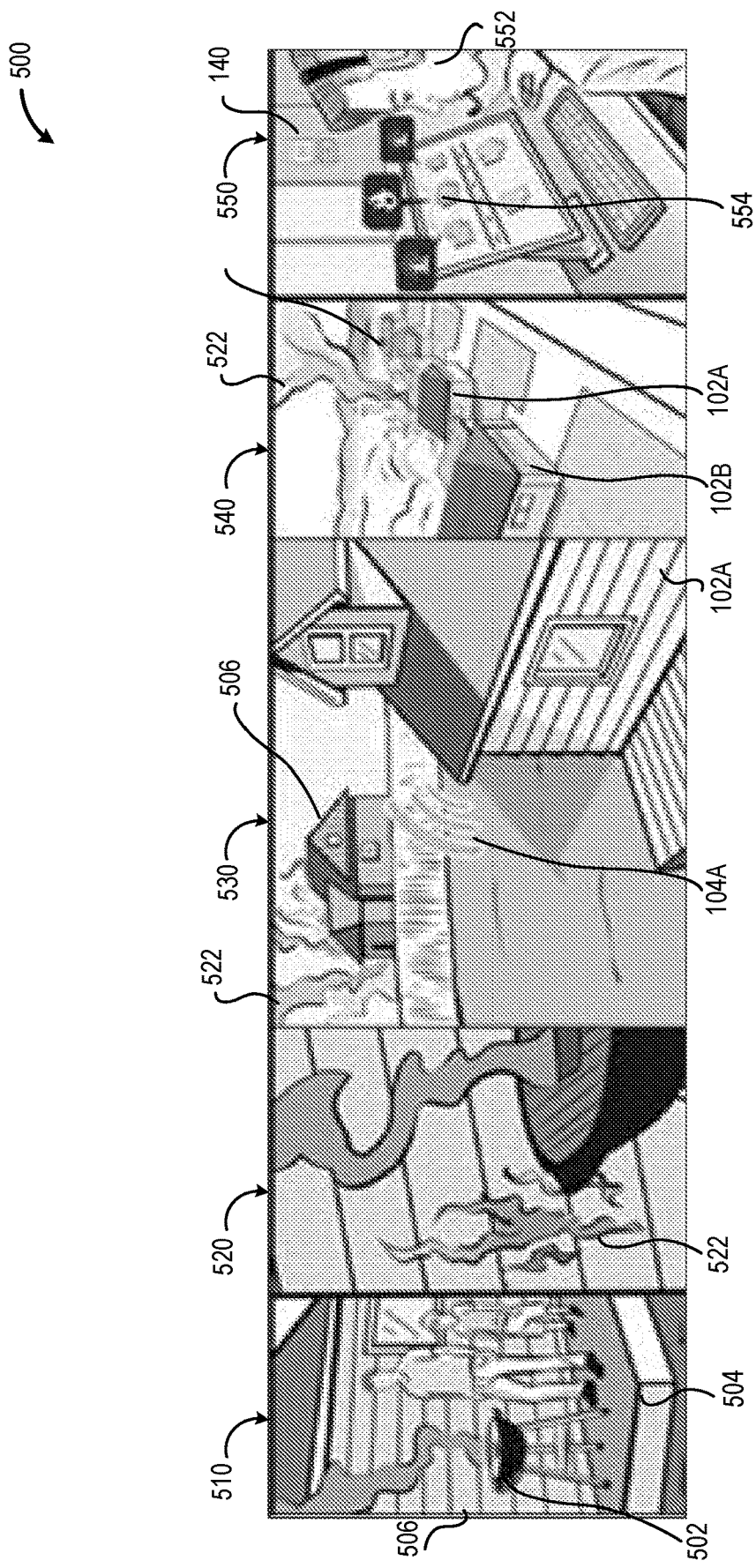
FIG. 5 provides an illustrative scenario in which a system for autonomous sharing of information and/or data between a plurality of geographically proximate nodes, each node is able to detect an event occurrence, autonomously broadcast a message that includes information and/or data regarding the event occurrence, and in which the system is able to cause another of the plurality of nodes to notify a third party, in accordance with at least one embodiment of the present disclosure.

FIG. 5 is an illustrative scenario in which a system 500 for autonomous sharing of information and/or data between geographically proximate nodes 102 detects an event occurrence 130, autonomously broadcasts a message 110 that includes information and/or data regarding the event occurrence, and in which another node 102B notifies a third party 140, in accordance with at least one embodiment of the present disclosure. In the first panel 510, a grill 502 is depicted set up on a deck 504 proximate a home 506. In the second panel 520, heat from the grill 502 has caused the siding on the home 506 to begin smoldering and ultimately, ignite. In the third panel 530, a home, representing the origin node 102A, detects the fire event occurrence 522 at the neighboring residence 506 using one or more sensors 104A. In the fourth panel 540, responsive to detecting the fire event occurrence 522, origin node 102A generates a first message 110A. The origin node 102A then broadcasts the first message 110A to one or more geographically proximate nodes 102B (i.e., geographically proximate persons, homes, machines, or similar) identified in the first message 110A as designated recipients 116. In the fifth panel 550, the designated recipient node 102B has generated and communicated a message 144 to a third party 140 emergency dispatch center where an operator 552 is able to see information and/or data 554 regarding the event occurrence 522 on a display or other output device.

Figure 6:
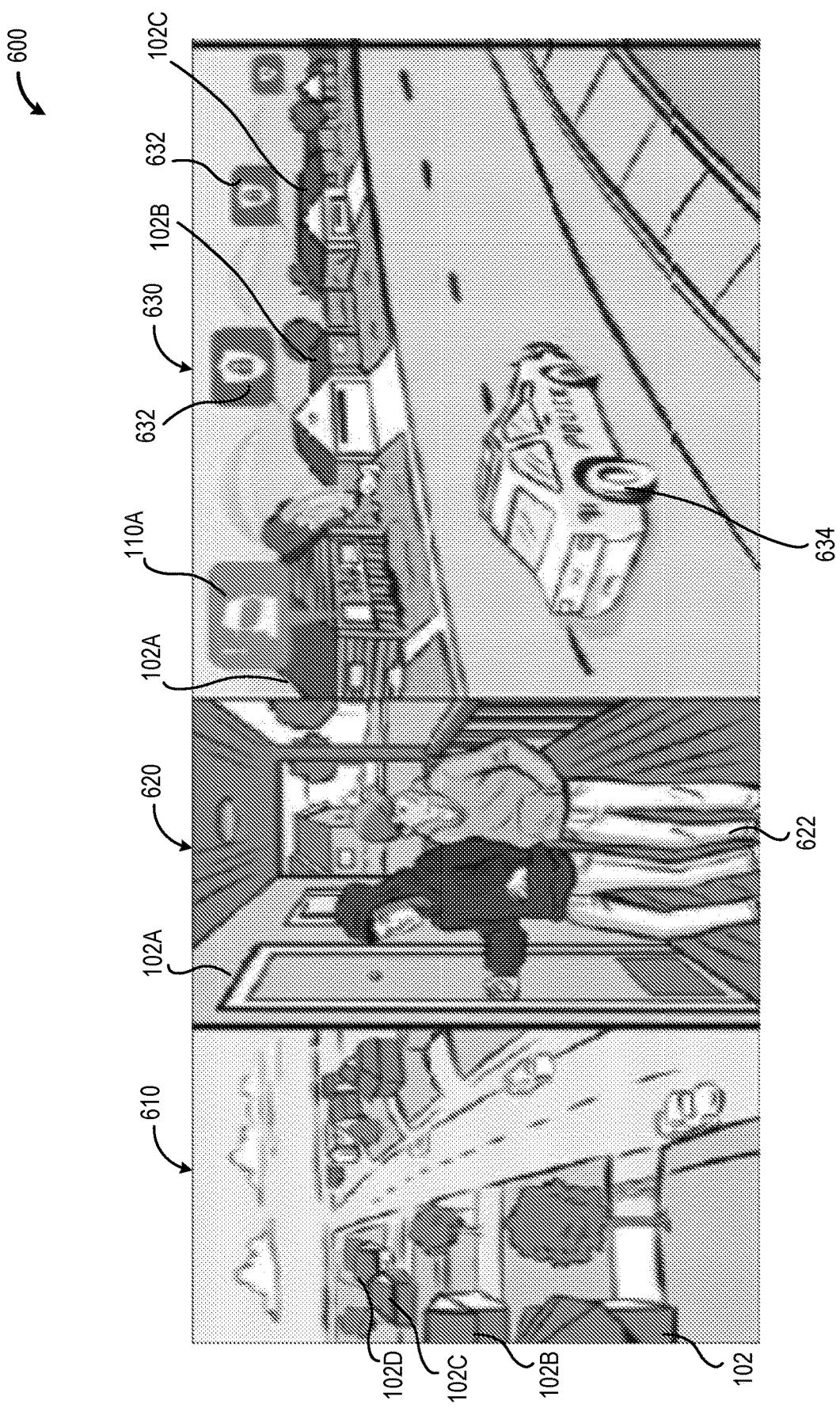
FIG. 6 provides an illustrative scenario in which a system for autonomous sharing of information and/or data between geographically proximate nodes detects an event occurrence, autonomously creates and broadcasts a message that includes information and/or data regarding the event occurrence, and notifies a third party, in accordance with at least one embodiment of the present disclosure.

FIG. 6 is an illustrative scenario in which a system 600 for autonomous sharing of information and/or data between geographically proximate nodes 102 detects an event occurrence 130, autonomously creates and broadcasts a message 110 that includes information and/or data regarding the event occurrence, and notifies a third party 140, in accordance with at least one embodiment of the present disclosure. In the first panel 610, a number of geographically proximate nodes 102A-102n are depicted as homes along a suburban street. In the second panel 610, burglars 622 break in to a home/origin node 102A (i.e., the event occurrence 130). One or more sensors 104 (not shown in FIG. 6) disposed in, on, or about the origin node 102A detect the break-in/event occurrence 130 and generate a first message 110A that includes information and/or data provided by the sensor 104 regarding the event occurrence 130 and identifying the location of the origin node 102A. In some implementations, some or all of the information and/or data included in the first message 110A may be encrypted or otherwise anonymized.

The origin node 102A broadcasts the first message 110A to the first designated recipient node 102B, that in turn, broadcasts a second message 110B to the second designated recipient node 102C. The message 110 will continue to be broadcast by successive designated recipient nodes 102D-102n until the number of hops (i.e., rebroadcasts) matches the maximum hop count.

As depicted in the third panel 630, in some implementations, the origin node 102A may transmit the first message 110A to a third party 140, such as an emergency call center, 911 center, or police. The third party 140 may then dispatch appropriate emergency response personnel 634 to the street address of the origin node 102A. In some implementations, the origin node 102A may transmit the first message 110A to the third party 140 without first encrypting or anonymizing the information and/or data contained in the first message 110A.

In some instances, the designated recipient nodes 102 may take precautionary measures based on the nature of the event occurrence 130. For example, as depicted in the third panel 630, in response to a detected break-in event occurrence 130, some or all of the designated recipient nodes 102 may enter a heightened security state 632.

Figure 7:
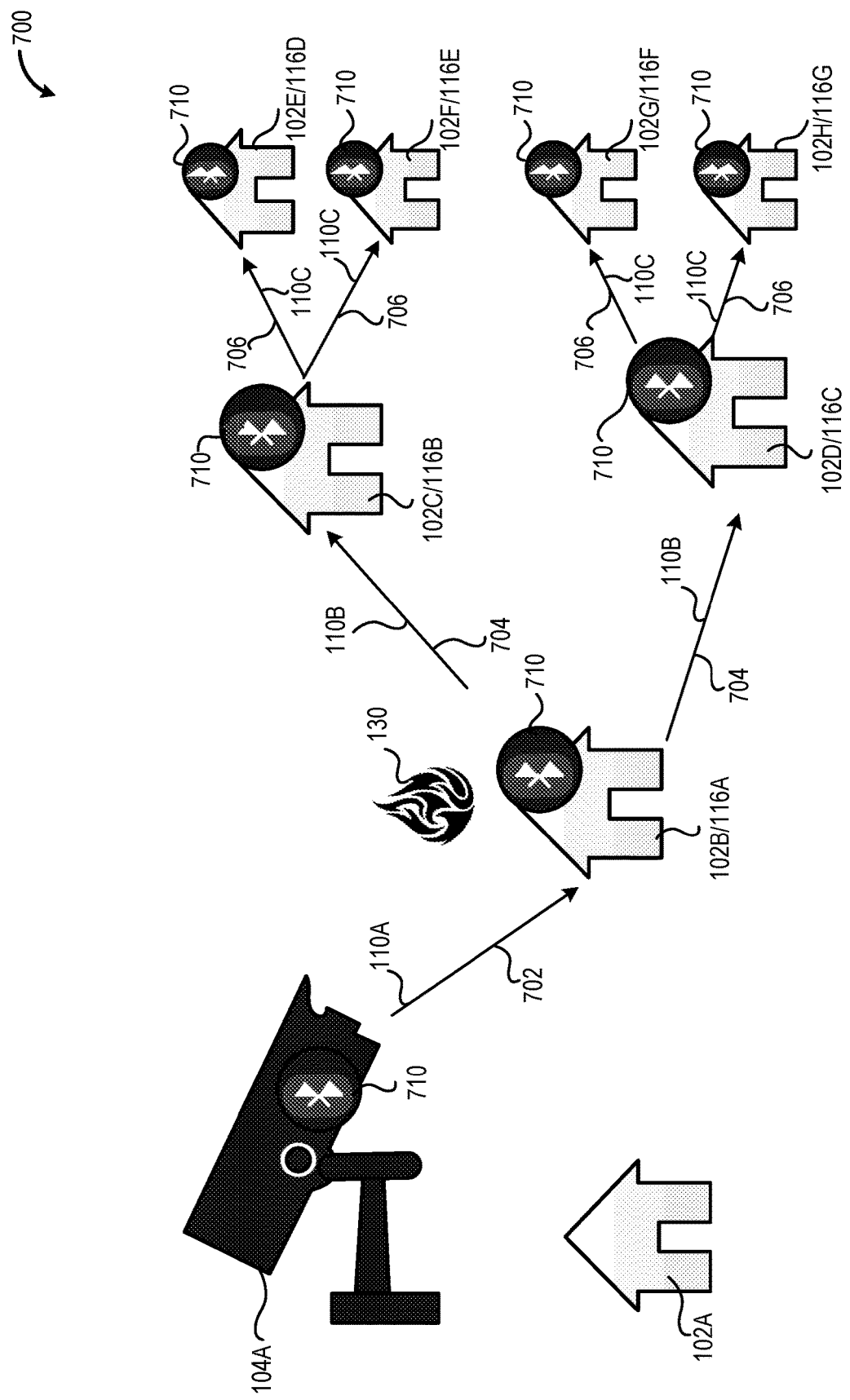
FIG. 7 provides an illustrative scenario in which a system for autonomous sharing of information and/or data between geographically proximate nodes using one or more BLUETOOTH® Low Energy (BLE) communication channels, in accordance with at least one embodiment of the present disclosure.

FIG. 7 is an illustrative scenario in which a system 700 for autonomous sharing of information and/or data between geographically proximate nodes 102 using one or more BLUETOOTH® Low Energy (BLE) communication channels 710, in accordance with at least one embodiment of the present disclosure. As depicted in FIG. 7, an origin node 102A that includes a video or still image camera sensor 104A detects a fire event occurrence 130 at a neighboring node 102B. The origin node 102A generates a first message 110A that includes information and/or data indicative of the address of the origin node 102A, the nature of the fire event occurrence 130, a list of designated recipient nodes 102B-102H, a hop count, and a maximum hop count. In some implementations, some or all of the information and/or data included in the first message 110A may be encrypted or anonymized.

The origin node communicates the first message 110A, representing the first hop 702, to a first designated recipient node 102B included in the list of designated recipient nodes as 116A. The first designated recipient node 102B generates a second message 110B and communicates the second message, representing the second hop 704, to two designated recipient nodes, 102C and 102D included in the list of designated recipient nodes as 116B and 116C, respectively.

Designated recipient nodes 102C and 102D each generate a third message 110C, representing the third, and final, hop 706, to four designated recipient nodes 102E, 102F, 102G, and 102H included in the list of designated recipient nodes as 116D, 116E, 116F, and 116G, respectively. In a similar manner, any greater or lesser number of hops may be performed using one or more range limited wireless communication protocols such as BLE.

Figure 8:
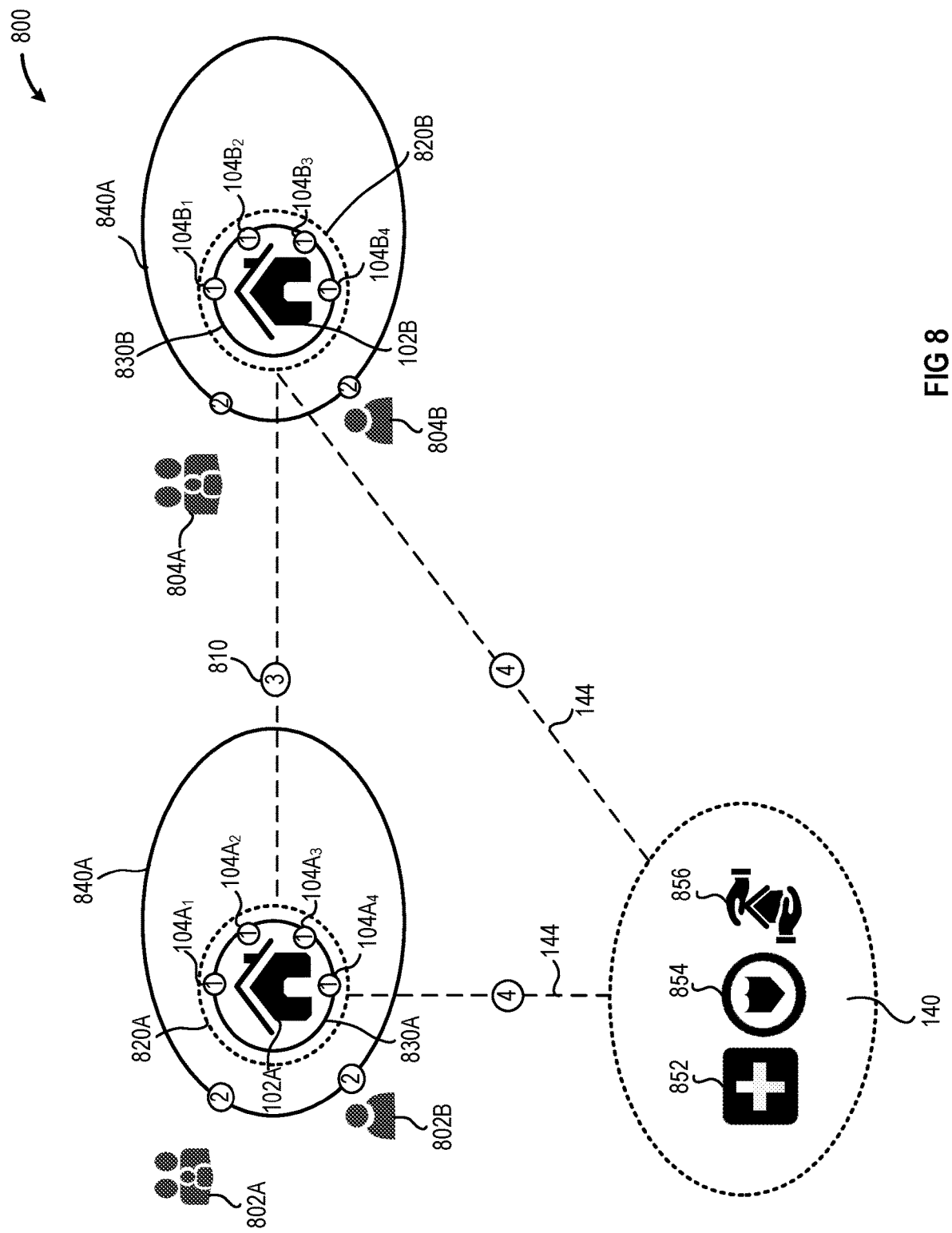
FIG. 8 provides an illustrative scenario in which a system for autonomous sharing of information and/or data and information/data aggregation and/or analysis of information and/or data collected by one or more geographically proximate nodes, in accordance with at least one embodiment of the present disclosure.

FIG. 8 is an illustrative scenario in which a system 800 for autonomous sharing 810 of information and/or data and information/data aggregation and/or analysis 820 of information and/or data collected by one or more geographically proximate nodes 102, in accordance with at least one embodiment of the present disclosure. Each node 102 may include any number of sensors 104. As depicted in FIG. 8, node 102A includes four sensors 104A1-104A4 (collectively, "sensors 104A") and node 102B also includes four sensors 104B1-104B4 (collectively, "sensors 104B"). Each of the sensors 104A may be communicably coupled to a network infrastructure 830A disposed in, on, or about node 102A. In a similar manner, each of the sensors 104B may be communicably coupled to a network infrastructure 830B disposed in, on, or about node 102B.

The sensing and analysis settings of each of the sensors 104A associated with node 102A may be determined by one or more system users 802A, 802B. Within node 102A, data from some or all of the sensors 104A may be aggregated and/or analyzed 820A. In embodiments, such information and/or data aggregation and/or analysis may be used to confirm or correlate an event occurrence 130A at or near node 102A. In other embodiments, such information and/or data aggregation and/or analysis may be used to confirm or correlate an event occurrence 130B at or near a neighboring node, such as node 102B. After successfully confirming or correlating event occurrence information and/or data, node 102A may generate a message 144 that is communicated to one or more third parties 140 such as fire 852, police 854, insurance 856 or other agencies, organizations, or entities associated with the particular event occurrence 130.

Within node 102B, data from some or all of the sensors 104B may be aggregated and/or analyzed 820B. In embodiments, such information and/or data aggregation and/or analysis may be used to confirm or correlate an event occurrence 130B at or near node 102B. In other embodiments, such information and/or data aggregation and/or analysis may be used to confirm or correlate an event occurrence 130A at or near a neighboring node, such as node 102A. After successfully confirming or correlating event occurrence information and/or data, node 102B may generate a message 144 that is communicated to one or more third parties 140 such as fire 852, police 854, insurance 856 or other agencies, organizations, or entities associated with the particular event occurrence 130.

Advantageously, users 802A and 802B (collectively, "users 802") may be provided access to and control of the information and/or data shared with other nodes 102 and with third parties 140. For example, users 802 may determine: which information and/or data to share with other personal nodes 102 (i.e., which information should be included in "social sharing" relationships), which information and/or data to share with other machine nodes 102 (i.e., which information should be included in "machine-to-machine sharing" relationships), which information and/or data to share with third parties 140 (i.e., which information should be included in "emergency response" relationships), which information and/or data to anonymize prior to sharing with other nodes 102, which other nodes 102 are designated recipient nodes 116, which other nodes 102 should be blocked, and the maximum number of hops permissible for each message generated.

Figure 9:
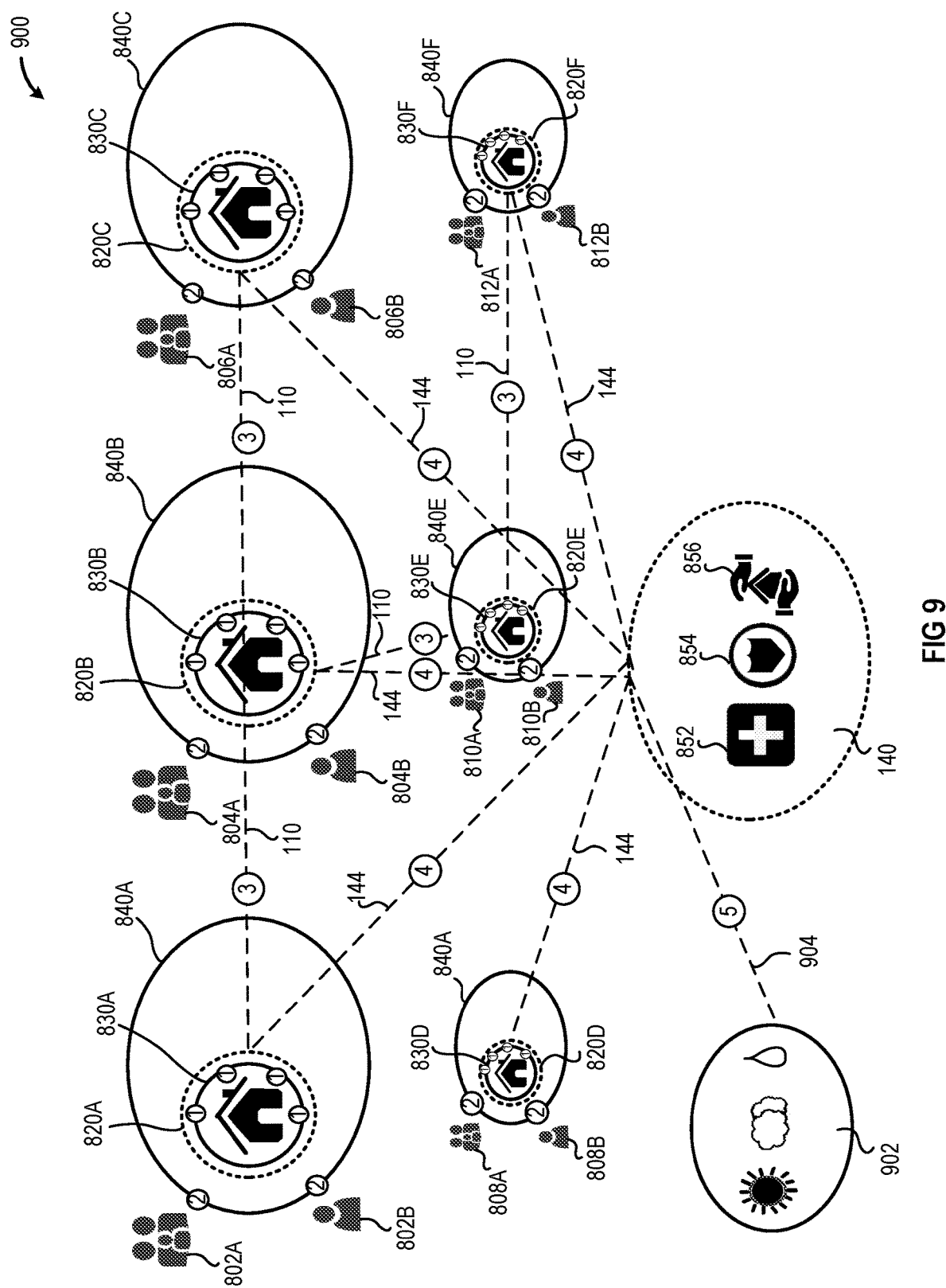
FIG. 9 provides an illustrative scenario in which a system for autonomous sharing of node, environmental, and third party information and/or data between geographically proximate nodes that may include residences, external environments, and commercial establishments, in accordance with at least one embodiment of the present disclosure.

FIG. 9 is an illustrative scenario in which a system 900 for autonomous sharing of node, environmental, and third party information and/or data between geographically proximate nodes 102 that may include residences, external environments 902, and commercial establishments, in accordance with at least one embodiment of the present disclosure. In some implementations, one or more environmental sensors 902 may be communicably coupled to some or all of the nodes 102 and/or communicably coupled to one or more third parties 140. The availability of such environmental information may beneficially permit the correlation of environmental data with an event occurrence 130 thereby providing further assurance that an event has occurred and that an abnormal atmospheric condition is not being mistaken for an event occurrence 130. Such may permit, for example, the sensors 104 coupled to one or more nodes 102 to distinguish between a smoke event occurrence 130 and formation of localized ground fog.

Figure 10:
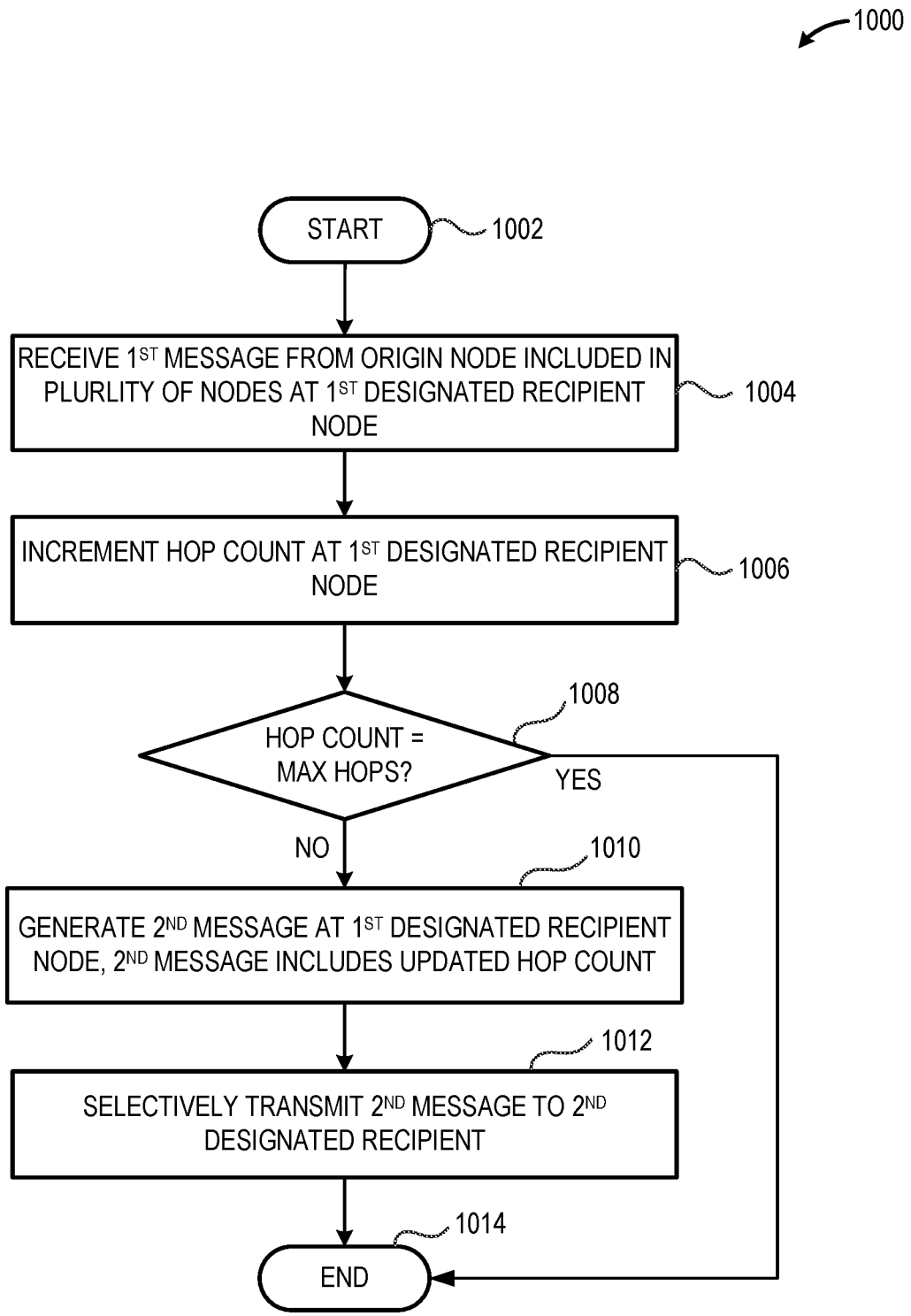
FIG. 10 provides a high level logic flow diagram of an illustrative method of sharing information and/or data in the form of messages communicated between geographically proximate nodes, in accordance with at least one embodiment of the present disclosure.

FIG. 10 provides a high level logic flow diagram 1000 of an illustrative method of sharing information and/or data in the form of messages 110 communicated between geographically proximate nodes 102, in accordance with at least one embodiment of the present disclosure. The method 1000 commences at 1002.

At 1004, the first designated recipient node 102B receives a first message 110A from the origin node 102. In at least some implementations, the first message 110A may include one or more identifier data fields 112 that contain information and/or data indicative of an identifier or information that may be unique to origin node 102A. The first message 110A may additionally include one or more event type data fields 114 that contain information and/or data indicative of a type, a class, or a specifics regarding the event occurrence 130 detected by sensor 104A at the origin node. The first message 110A may additionally include one or more designated recipient data fields that contain data and/or information indicative of a number of designated recipients 116. The first message 110A one or more data fields 122 that contain information and/or data indicative of a priority value assigned by the origin node 102A based upon the perceived threat posed by the event occurrence 130. The first message 110A may further include one or more data fields 210 that include data or information indicative of a hop count, the number of times the message 110A has been forwarded by a designated recipient node. The first message may further include one or more data fields 212 that include data or information indicative of a maximum hop count, the maximum number of times the message 110A may be forwarded by a designated recipient node.

At 1006, the first designated recipient node 102B increments by one (1) the value in the one or more hop count data fields 210 included in the first message 110A.

At 1008, the first designated recipient node 102B determines whether the value in the one or more hop count data fields 210 is equal to the value included in the one or more maximum hop count data fields 212. If the value in the one or more hop count data fields 210 equals the value in the one or more maximum hop count data fields 212, the method 1000 concludes at 1014. If the value in the one or more hop count data fields 210 is less than the value in the one or more maximum hop count data fields 212, the method proceeds to 1010.

At 1010, the first designated recipient node generates a second message 110B. In addition to the data fields described above, the second message 110B may also include one or more recipient node data fields 120 that contain information and/or data contributed by the first designated recipient node 102B. For example, in some instances, the one or more recipient node data fields 120 may include information and/or data indicative of the event occurrence 130 provided by one or more sensors 104B coupled to the first designated recipient node 102B.

At 1012, the first designated recipient node 102B transmits the second message to at least one other node 102C in the plurality of nodes 102. In at least some implementations, the first designated recipient node 102B may transmit the second message to at least a second designated recipient node 102C that is included in the information and/or data contained in the one or more designated recipient data fields 116 included in the first message 110A. The method 1000 concludes at 1014.

Figure 11:
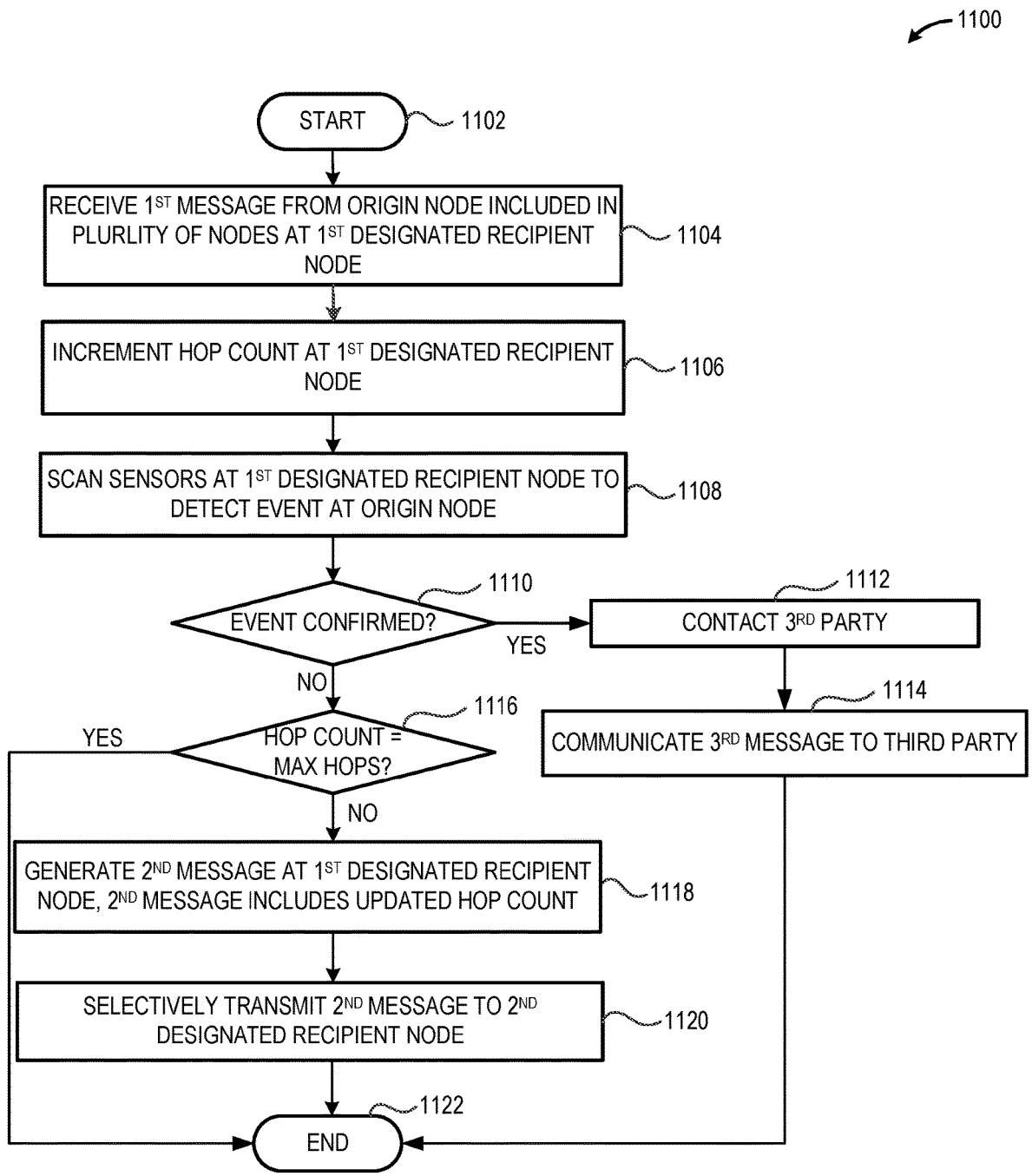
FIG. 11 provides a high level logic flow diagram of an illustrative method of sharing information and/or data between geographically proximate nodes and notifying a third party in response to confirmation of an event occurrence, in accordance with at least one embodiment of the present disclosure.

FIG. 11 provides a high level logic flow diagram of an illustrative method 1100 of sharing information and/or data between geographically proximate nodes and notifying a third party in response to confirmation of an event occurrence, in accordance with at least one embodiment of the present disclosure. The method 1100 commences at 1102.

At 1104, the first designated recipient node 102B receives a first message 110A from the origin node 102. In at least some implementations, the first message 110A may include one or more identifier data fields 112 that contain encrypted or unencrypted information and/or data indicative of an identifier or information that may be unique to origin node 102A. The first message 110A may additionally include one or more event type data fields 114 that contain encrypted or unencrypted information and/or data indicative of a type, a class, or a specifics regarding the event occurrence 130 detected by sensor 104A at the origin node. The first message 110A may additionally include one or more designated recipient data fields that contain encrypted or unencrypted information and/or data indicative of a number of designated recipients 116. The first message 110A one or more data fields 122 that contain information and/or data indicative of a priority value assigned by the origin node 102A based upon the perceived threat posed by the event occurrence 130. The first message 110A may further include one or more data fields 210 that include data or information indicative of a hop count, the number of times the message 110A has been forwarded by a designated recipient node. The first message may further include one or more data fields 212 that include data or information indicative of a maximum hop count, the maximum number of times the message 110A may be forwarded by a designated recipient node.

At 1106, the first designated recipient node 102B increments by one (1) the value in the one or more hop count data fields 210 included in the first message 110A.

At 1108, the first designated recipient node 102B may scan one or more communicably coupled sensors 104B to confirm or otherwise corroborate the event occurrence 130 included in the first message 110A received from the origin node 102A. For example, the first designated recipient node 102B may determine whether evidence of the event occurrence 130 (e.g., smoke from a reported fire event occurrence 130 included in the received first message 110A) in the signal(s) provided by one or more communicably coupled sensors 104B.

At 1110, if the first designated recipient node 102B is unable to confirm or otherwise corroborate the event occurrence 130 included in the received first message 110A, method 1100 continues at 1116. If the first designated recipient node 102B is able to confirm or otherwise corroborate the event occurrence 130 included in the received first message 110A, method 1100 continues at 1112.

At 1112, the first designated recipient node 102B may communicate a message 144 to a third party 140. In at least some implementations, the message 144 may include one or more identifier data fields 112 that contain unencrypted information and/or data indicative of an identifier or information that may be unique to origin node 102A. The message 144 may additionally include one or more event type data fields 114 that contain unencrypted information and/or data indicative of a type, a class, or a specifics regarding the event occurrence 130 detected by sensor 104A at the origin node. The message 144 may further include one or more sensor data fields 146 that contain unencrypted information and/or data indicative of the sensor 104B output used to confirm or otherwise corroborate the event occurrence 130. The message 144 may additionally include one or more data fields 122 that contain information and/or data indicative of a priority value based upon the perceived threat posed by the event occurrence 130 that may be assigned by either or both the origin node 102A and/or the first designated recipient node 102B.

At 1114, the first designated recipient node 102B may communicate the message 144 to a third party 140. In some instances, the third party 140 may include one or more parties external to the plurality of nodes 102. In some instances, the third party 140 may include one or more emergency response entities, one or more commercial entities, one or more insurance entities, one or more industrial entities, or combinations thereof. Upon communicating the message 144 to the third party 140, the method 1100 may terminate at 1122.

At 1116, the first designated recipient node 102B determines whether the value in the one or more hop count data fields 210 is equal to the value included in the one or more maximum hop count data fields 212. If the value in the one or more hop count data fields 210 equals the value in the one or more maximum hop count data fields 212, the method 1100 concludes at 1122. If the value in the one or more hop count data fields 210 is less than the value in the one or more maximum hop count data fields 212, the method proceeds to 1118.

At 1118, the first designated recipient node generates a second message 110B. In addition to the data fields described above, the second message 110B may also include one or more recipient node data fields 120 that contain information and/or data contributed by the first designated recipient node 102B. For example, in some instances, the one or more recipient node data fields 120 may include information and/or data indicative of the event occurrence 130 provided by one or more sensors 104B coupled to the first designated recipient node 102B.

At 1120, the first designated recipient node 102B transmits the second message to at least one other node 102C in the plurality of nodes 102. In at least some implementations, the first designated recipient node 102B may transmit the second message to at least a second designated recipient node 102C that is included in the information and/or data contained in the one or more designated recipient data fields 116 included in the first message 110A. The method 1100 concludes at 1122.

Figure 12:
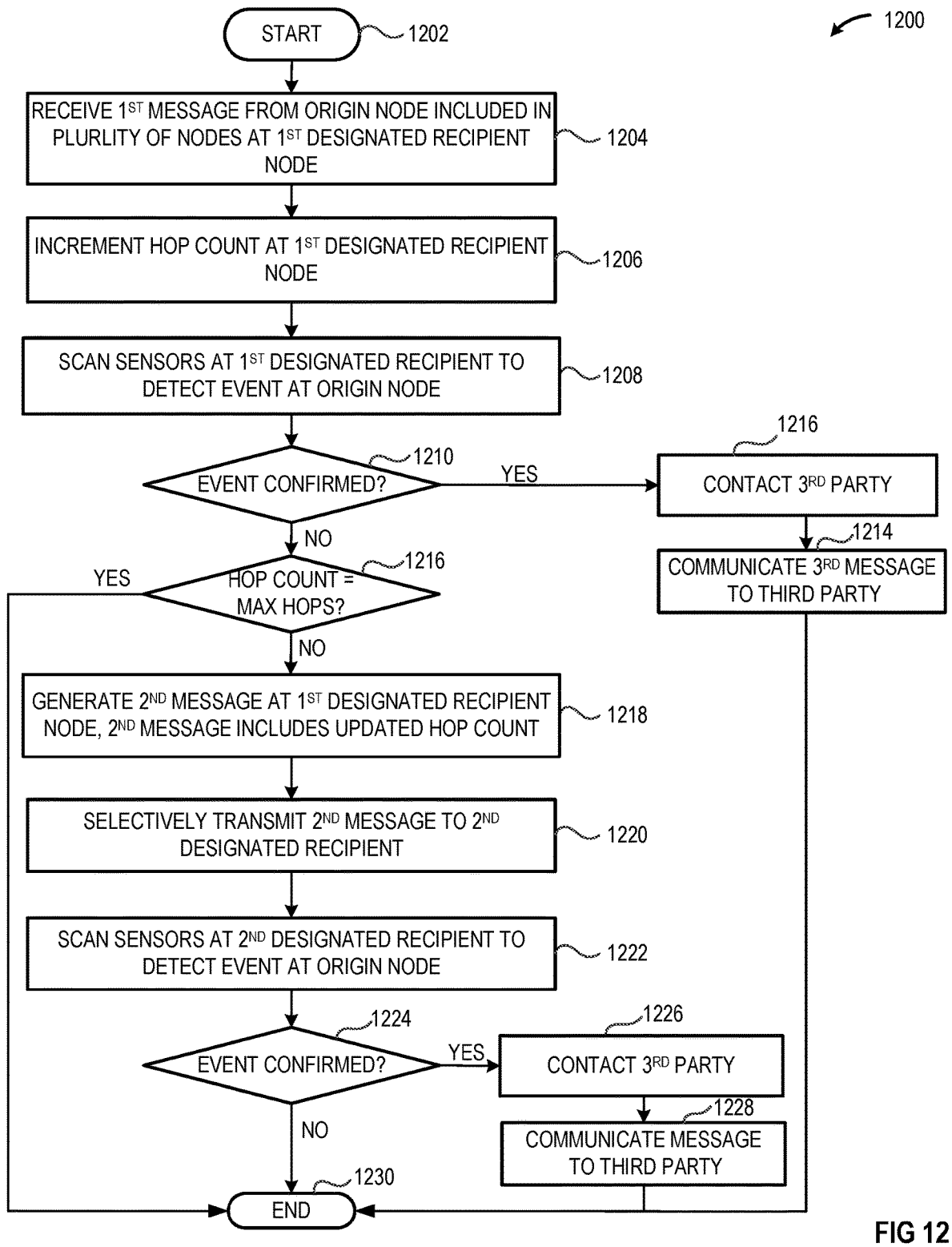
FIG. 12 provides a high level logic flow diagram of another illustrative method of sharing information and/or data between geographically proximate nodes and notifying a third party upon confirmation of an event occurrence, in accordance with at least one embodiment of the present disclosure.

FIG. 12 provides a high level logic flow diagram of another illustrative method 1200 of sharing information and/or data between geographically proximate nodes 102 and notifying a third party 140 upon confirmation of an event occurrence 130, in accordance with at least one embodiment of the present disclosure. The method 1200 commences at 1202.

At 1204, the first designated recipient node 102B receives a first message 110A from the origin node 102. In at least some implementations, the first message 110A may include one or more identifier data fields 112 that contain encrypted or unencrypted information and/or data indicative of an identifier or information that may be unique to origin node 102A. The first message 110A may additionally include one or more event type data fields 114 that contain encrypted or unencrypted information and/or data indicative of a type, a class, or a specifics regarding the event occurrence 130 detected by sensor 104A at the origin node. The first message 110A may additionally include one or more designated recipient data fields that contain encrypted or unencrypted information and/or data indicative of a number of designated recipients 116. The first message 110A one or more data fields 122 that contain information and/or data indicative of a priority value assigned by the origin node 102A based upon the perceived threat posed by the event occurrence 130. The first message 110A may further include one or more data fields 210 that include data or information indicative of a hop count, the number of times the message 110A has been forwarded by a designated recipient node. The first message may further include one or more data fields 212 that include data or information indicative of a maximum hop count, the maximum number of times the message 110A may be forwarded by a designated recipient node.

At 1206, the first designated recipient node 102B increments by one (1) the value in the one or more hop count data fields 210 included in the first message 110A.

At 1208, the first designated recipient node 102B may scan one or more communicably coupled sensors 104B to confirm or otherwise corroborate the event occurrence 130 included in the first message 110A received from the origin node 102A. For example, the first designated recipient node 102B may determine whether evidence of the event occurrence 130 (e.g., smoke from a reported fire event occurrence 130 included in the received first message 110A) in the signal(s) provided by one or more communicably coupled sensors 104B.

At 1210, if the first designated recipient node 102B is unable to confirm or otherwise corroborate the event occurrence 130 included in the received first message 110A, method 1200 continues at 1216. If the first designated recipient node 102B is able to confirm or otherwise corroborate the event occurrence 130 included in the received first message 110A, method 1200 continues at 1212.

At 1212, the first designated recipient node 102B may communicate a message 144 to a third party 140. In at least some implementations, the message 144 may include one or more identifier data fields 112 that contain unencrypted information and/or data indicative of an identifier or information that may be unique to origin node 102A. The message 144 may additionally include one or more event type data fields 114 that contain unencrypted information and/or data indicative of a type, a class, or a specifics regarding the event occurrence 130 detected by sensor 104A at the origin node. The message 144 may further include one or more sensor data fields 146 that contain unencrypted information and/or data indicative of the sensor 104B output used to confirm or otherwise corroborate the event occurrence 130. The message 144 may additionally include one or more data fields 122 that contain information and/or data indicative of a priority value based upon the perceived threat posed by the event occurrence 130 that may be assigned by either or both the origin node 102A and/or the first designated recipient node 102B.

At 1214, the first designated recipient node 102B may communicate the message 144 to a third party 140. In some instances, the third party 140 may include one or more parties external to the plurality of nodes 102. In some instances, the third party 140 may include one or more emergency response entities, one or more commercial entities, one or more insurance entities, one or more industrial entities, or combinations thereof. Upon communicating the message 144 to the third party 140, the method 1200 may terminate at 1230.

At 1216, the first designated recipient node 102B determines whether the value in the one or more hop count data fields 210 is equal to the value included in the one or more maximum hop count data fields 212. If the value in the one or more hop count data fields 210 equals the value in the one or more maximum hop count data fields 212, the method 1200 concludes at 1230. If the value in the one or more hop count data fields 210 is less than the value in the one or more maximum hop count data fields 212, the method 1200 proceeds to 1218.

At 1218, the first designated recipient node generates a second message 110B. In addition to the data fields described above, the second message 110B may also include one or more recipient node data fields 120 that contain information and/or data contributed by the first designated recipient node 102B. For example, in some instances, the one or more recipient node data fields 120 may include information and/or data indicative of the event occurrence 130 provided by one or more sensors 104B coupled to the first designated recipient node 102B. The second message 110B includes the updated hop count (i.e., the hop count after incrementing by one (1) at 1206).

At 1220, the first designated recipient node 102B transmits the second message to at least one other node 102C in the plurality of nodes 102. In at least some implementations, the first designated recipient node 102B may transmit the second message to at least a second designated recipient node 102C that is included in the information and/or data contained in the one or more designated recipient data fields 116 included in the first message 110A.

At 1222, the second designated recipient node 102C increments by one (1) the value in the one or more hop count data fields 210 included in the second message 110A.

At 1224, the second designated recipient node 102C may scan one or more communicably coupled sensors 104C to confirm or otherwise corroborate the event occurrence 130 included in the first message 110A originally generated by the origin node 102A. For example, the second designated recipient node 102C may determine whether evidence of the event occurrence 130 (e.g., smoke from a reported fire event occurrence 130 included in the first message 110A) in the signal(s) provided by one or more communicably coupled sensors 104C.

At 1226, if the second designated recipient node 102C is unable to confirm or otherwise corroborate the event occurrence 130 included in the received second message 110B, method 1200 terminates at 1232. If the second designated recipient node 102C is able to confirm or otherwise corroborate the event occurrence 130 included in the received second message 110B, method 1200 continues at 1228.

At 1228, the second designated recipient node 102C may communicate a message 144 to a third party 140. In at least some implementations, the message 144 may include one or more identifier data fields 112 that contain unencrypted information and/or data indicative of an identifier or information that may be unique to origin node 102A. The message 144 may additionally include one or more event type data fields 114 that contain unencrypted information and/or data indicative of a type, a class, or a specifics regarding the event occurrence 130 detected by sensor 104A at the origin node. The message 144 may further include one or more sensor data fields 146 that contain unencrypted information and/or data indicative of the sensor 104B output used to confirm or otherwise corroborate the event occurrence 130. The message 144 may additionally include one or more data fields 122 that contain information and/or data indicative of a priority value based upon the perceived threat posed by the event occurrence 130 that may be assigned by either or both the origin node 102A and/or the first designated recipient node 102B.

At 1230, the second designated recipient node 102C may communicate the message 144 to a third party 140. In some instances, the third party 140 may include one or more parties external to the plurality of nodes 102. In some instances, the third party 140 may include one or more emergency response entities, one or more commercial entities, one or more insurance entities, one or more industrial entities, or combinations thereof. Upon communicating the message 144 to the third party 140, the method 1200 may terminate at 1232.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The following examples pertain to further embodiments. The following examples of the present disclosure may comprise subject material such as a device, a method, means for performing acts based on the method and/or a system for selectively sharing information and/or data between geographically proximate nodes 102 and/or third parties 140.

Such systems and methods advantageously and beneficially facilitate the timely detection, correlation, and reporting of event occurrences within the geographic region occupied by the nodes 102. Such systems and methods also advantageously and beneficially facilitate the collection, aggregation, and analysis of data collected across a number of nodes disposed within a defined geographic area or region.

According to example 1, there is provided a communication system. The communication system may include a plurality of nodes, including at least an origin node, a first designated recipient node, and a second designated recipient node. Each of the plurality of nodes logically associated with a geographic location may include: at least one wireless communications interface to receive a first message from an origin node, the first message including data indicative at least: an event occurrence type and at least a first designated recipient node; a configurable circuit communicably coupled to the at least one wireless communications interface; a storage device communicably coupled to the configurable circuit, the storage device including machine readable instructions that transform the configurable circuit to a communications link control circuit that includes: event identification circuitry to determine an event occurrence type; event priority determination circuitry to determine a priority logically associated with the event occurrence; message generation circuitry to autonomously generate a second message that includes data indicative of: the event occurrence type provided by the origin node; the determined event occurrence priority received from the event priority determination circuitry; and the determined event occurrence type received from the event identification circuitry; and message transmission circuitry to autonomously, selectively, transmit the second message to at least a second designated recipient node.

Example 2 may include elements of example 1 where the communications link control circuit further may include authentication circuitry to: verify authentication data included in the first message corresponds to the origin node; and generate authentication data that corresponds to the first designated recipient node for inclusion in the second message.

Example 3 may include elements of example 1 where the machine readable instructions that cause the communications link control circuit to autonomously, selectively, transmit the second message to at least the second designated recipient node may further cause the communications link control circuit to autonomously, selectively, transmit the second message to at least the second designated recipient node, the second designated recipient node autonomously selected by the communications link control circuit based at least in part on a type of defined event occurrence.

Example 4 may include elements of example 1 where the machine-readable instructions may further cause the message transmission circuitry to autonomously, selectively, transmit the second message to at least the second designated recipient node, the second designated recipient node autonomously selected by the message transmission circuitry based at least on the event occurrence type.

Example 5 may include elements of example 1 where the machine readable instructions may further cause the message generation circuitry to: generate a second message that includes data provided by the origin node, data indicative of one or more media files that include information indicative of the event occurrence, and data indicative of at least one designated recipient node.

Example 6 may include elements of example 1 where each of the plurality of nodes may be communicably coupled to at least one or other node included in the plurality of nodes via a BLUETOOTH® low energy wireless communications interface.

Example 7 may include elements of example 6 where each of the plurality of nodes may be communicably coupled to at least one or other node included in the plurality of nodes via a BLUETOOTH® low energy advertising channel.

Example 8 may include elements of example 1 where the first message may further include data indicative of a hop count and data indicative of a maximum hop count and where the communications link control circuit may further include hop count comparator circuitry to compare the data indicative of the hop count included in the first message with the data indicative of the maximum hop count included in the first message and where the machine-readable instructions may cause the message transmission circuitry to further selectively transmit the second message to at least the second designated recipient node only when the hop count included in the first message is less than the maximum hop count included in the first message.

Example 9 may include elements of example 1 where the first message may further include data indicative of at least the first designated recipient node.

Example 10 may include elements of any of examples 1 through 9 where each of the plurality of nodes may further include at least one sensor communicably coupled to the configurable circuit, the at least one sensor to provide a signal that includes data indicative of an event occurrence.

Example 11 may include elements of example 10 where the at least one sensor may provide a signal that includes data indicative of an event occurrence proximate the first designated recipient node, where the machine readable instructions may further cause the message generation circuitry to generate a message that includes data indicative of the event occurrence proximate the first designated recipient node, and where the machine-readable instructions may further cause the message transmission circuitry to communicate the generated message to at least one other designated recipient node in the plurality of nodes.

Example 12 may include elements of example 10 where the at least one sensor may further provide a signal that includes data indicative of the event occurrence at a geographic location remote from the first designated recipient node, where the machine-readable instructions may further cause the event identification circuitry to attempt to confirm the event occurrence at the geographic location remote from the first designated recipient node, and where the machine-readable instructions may further cause the message transmission circuitry to selectively transmit a notification message that includes data indicative of the confirmed event occurrence from the first designated recipient node to a third party external to the plurality of nodes responsive to a successful confirmation of the event occurrence at the geographic location remote from the first designated recipient node.

Example 13 may include elements of example 12 where the machine-readable instructions may further cause the message generation circuitry to generate the second message that includes data indicative of the event occurrence responsive to an unsuccessful confirmation of the event occurrence at the geographic location remote from the first designated recipient node and where the machine-readable instructions may further cause the message transmission circuitry to selectively transmit the second message to at least one other designated recipient node included in the plurality of nodes.

According to example 14, there is provided a communication method. The communication method may include receiving a first message from an origin node included in a plurality of nodes at a second node included in the plurality of nodes. The first message may include: data indicative of an event occurrence remote from the first designated recipient node; data representative of a hop count; data representative of a maximum number of hops; and data representative of at least one designated recipient node. The method may further include incrementing the hop count by the first designated recipient node, determining whether the hop count equals the maximum number of hops by the first designated recipient node, and responsive to a determination that the hop count is less than the maximum number of hops, generating a second message at the first designated recipient node responsive to receipt of the first message. The second message may include: data or information indicative of the event occurrence received from the origin node; data representative of an incremented hop count; data representative of the maximum hop count; and data representative of the at least one designated recipient node. The method may additionally include selectively transmitting the second message to at least a second designated recipient node.

Example 15 may include elements of example 14 where the first message may further include authentication data corresponding to the origin node and where the second message may further include authentication data corresponding to the first designated recipient node.

Example 16 may include elements of example 14 where selectively transmitting the second message to at least a second designated recipient node may include selectively transmitting the second message to the second designated recipient node. The second designated recipient node may include at least one of: a designated individual recipient, a designated recipient node in the plurality of nodes, or a third party external to the plurality of nodes.

Example 17 may include elements of example 14, and may additionally include autonomously selecting the first designated recipient node based, at least in part, on the type of event occurrence.

Example 18 may include elements of example 14 where generating a second message at the first designated recipient node responsive to receipt of the first message may include generating a second message that further includes data provided by the first designated recipient node and data representative of one or more media files that include information indicative of the event occurrence.

Example 19 may include elements of example 14 where selectively transmitting the second message to at least a second designated recipient node may include selectively transmitting the second message to at least a second designated recipient node via a BLUETOOTH® low energy wireless communications interface.

Example 20 may include elements of example 19 where selectively transmitting the second message to at least a second designated recipient node via a BLUETOOTH® low energy wireless communications interface may include selectively transmitting the second message to at least the second designated recipient node via a BLUETOOTH® low energy advertising channel.

Example 21 may include elements of any of examples 14 through 20, and may additionally include generating, by a sensor communicably coupled to the first designated recipient node, a signal that includes data indicative of an event occurrence proximate the first designated recipient node, generating, at the first designated recipient node, a message that includes data indicative of the event occurrence proximate the first designated recipient node, and selectively transmitting the message to at least one other node in the plurality of nodes.

According to example 22, there is provided a wireless communication system. The communication system may include a means for receiving a first message from a first node included in a plurality of nodes at a second node included in the plurality of nodes. The first message may include data indicative of at least one of: an occurrence of a defined event or an environmental condition remote from at least the second node; a hop count; a maximum number of hops; and at least one first designated recipient. The system may additionally include a means for incrementing the hop count by the second node, a means for determining whether the hop count equals the maximum number of hops by the second node and, responsive to a determination that the hop count is less than the maximum number of hops: a means for generating a second message at the second node responsive to receipt of the first message. The second message may include data or information indicative of: the occurrence of the defined event or the environmental condition remote from the second node; an incremented hop count; the maximum hop count; and at least one first designated recipient. The method may additionally include a means for selectively transmitting the second message to at least a first designated recipient.

Example 23 may include elements of example 22 where the means for generating a second message at the second node responsive to receipt of the first message may further include: a means for generating a second message at the second node responsive to receipt of the first message, the second message including data representative of at least one of: at least one designated individual, at least one designated node in the plurality of nodes, or at least one third party external to the plurality of nodes.

Example 24 may include elements of example 22, and may additionally include a means for autonomously selecting the first designated recipient based at least in part on at least one of: a type of defined event occurrence or a type of environmental condition.

Example 25 may include elements of example 22 where the means for generating a second message at the second node responsive to receipt of the first message may further include: a means for generating a second message that further includes data provided by the second node and one or more media files that include data or information indicative of the occurrence of the defined event or the environmental condition remote from the second node.

Example 26 may include elements of example 22 where the means for selectively transmitting the second message to at least a first designated recipient may further include: a means for selectively transmitting the second message to at least a first designated recipient via a BLUETOOTH® low energy wireless communications interface.

Example 27 may include elements of example 26 where the means for selectively transmitting the second message to at least a first designated recipient via a BLUETOOTH® low energy wireless communications interface may further include a means for selectively transmitting the second message to at least a first designated recipient via a BLUETOOTH® low energy advertising channel.

Example 28 may include elements of any of examples 22 through 27, and may additionally include a means for generating, by a sensor communicably coupled to the second node, a signal indicative of a detected environmental condition or a detected event occurrence proximate the second node, a means for generating, at the second node, a third message that includes data indicative of at least one of the detected environmental condition or the detected event occurrence proximate the second node, and a means for selectively transmitting the third message to at least a second designated recipient.

According to example 29, there is provided a storage device that includes machine-readable instructions that, when executed by a configurable circuit, transform the configurable circuit to a communications link control circuit. The communications link control circuit to: receive a first message from an origin node included in a plurality of nodes at a second node included in the plurality of nodes, the first message including: data indicative of an event occurrence remote from the first designated recipient node; data representative of a hop count; data representative of a maximum number of hops; and data representative of at least one designated recipient node. The communications link control circuit to: increment the hop count by the first designated recipient node; determine whether the hop count equals the maximum number of hops by the first designated recipient node and, responsive to a determination that the hop count is less than the maximum number of hops, generate a second message at the first designated recipient node responsive to receipt of the first message. The second message may include: data or information indicative of the event occurrence received from the origin node; data representative of an incremented hop count; data representative of the maximum hop count; and data representative of the at least one designated recipient node. The communications link control circuit to selectively transmit the second message to at least a second designated recipient node.

Example 30 may include elements of example 29 where the first message may further include authentication data that corresponds to the origin node and where the second message may further include authentication data that corresponds to the first designated recipient node.

Example 31 may include elements of example 29 where the machine-readable instructions that cause the communications link control circuit to selectively transmit the second message to at least a second designated recipient node, may further cause the communications link control circuit to: selectively transmit the second message to the second designated recipient node, where the second designated recipient node includes at least one of: a designated individual recipient; a designated recipient node in the plurality of nodes; or a third party external to the plurality of nodes.

Example 32 may include elements of example 29 where the machine-readable instructions may further cause the communications link control circuit to: autonomously select the first designated recipient node based, at least in part, on a type of event occurrence.

Example 33 may include elements of example 29 where the machine-readable instructions that cause the communications link control circuit to generate a second message at the first designated recipient node responsive to receipt of the first message, may further cause the communications link control circuit to: generate a second message that further includes data provided by the first designated recipient node and data representative of one or more media files that include information indicative of the event occurrence.

Example 34 may include elements of example 29 where the machine-readable instructions that cause the communications link control circuit to selectively transmit the second message to at least a second designated recipient node, may further cause the communications link control circuit to: selectively transmit the second message to at least a second designated recipient node via a BLUETOOTH® low energy wireless communications interface.

Example 35 may include elements of example 34 where the machine-readable instructions that cause the communications link control circuit to selectively transmit the second message to at least a second designated recipient node via a BLUETOOTH® low energy wireless communications interface may further cause the communications link control circuit to selectively transmit the second message to at least the second designated recipient node via a BLUETOOTH® low energy advertising channel.

Example 36 may include elements of any of examples 29 through 35 where the machine-readable instructions may further cause the communications link controller to: cause a sensor communicably coupled to the first designated recipient node, to generate a signal that includes data indicative of an event occurrence proximate the first designated recipient node; generate a message that includes data indicative of the event occurrence proximate the first designated recipient node; and selectively transmit the message to at least one other node in the plurality of nodes.

According to example 37, there is provided a system for autonomous communicating between geographically proximate nodes using a limited-range communication interface, the system being arranged to perform the method of any of examples 14 through 21.

According to example 38, there is provided a chipset arranged to perform the method of any of examples 14 through 21.

According to example 39, there is provided a storage device comprising a plurality of instructions that, in response to be being executed on a processor-based device, cause the processor-based device to carry out the method according to any of examples 14 through 21.

According to example 40, there is provided a device to autonomously communicate with at least one other geographically proximate node using a limited-range communications interface, the device being arranged to perform the method of any of examples 14 through 21.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. A method for wireless communication, the method comprising:
  receiving a first message from a messaging node of a plurality of nodes at a first designated recipient node included in the plurality of nodes, the first message including:
    data indicative of an event occurrence remote from the first designated recipient node;
    data indicative of a hop count;
    data indicative of a maximum number of hops; and
    data of at least one designated recipient node;
  incrementing the hop count by the first designated recipient node;
  determining whether the hop count equals the maximum number of hops by the first designated recipient node;
  in response to a determination that the hop count is less than the maximum number of hops, generating a second message at the first designated recipient node at the first designated recipient node responsive to receipt of the first message, the second message including:
data indicative of the event occurrence received from the messaging node;
data indicative of an incremented hop count;
data indicative of the maximum number of hops; and
data indicative of the at least one designated recipient node;
selectively transmitting the second message to a second designated recipient node included in the plurality of nodes;
generating via a sensor communicatively coupled to the first designated recipient node, a signal that includes data indicative of an event occurrence proximate the first designated recipient node;
generating, at the first designated recipient node, a message that includes the data indicative of the event occurrence proximate the first designated recipient node; and
selectively transmitting the message to at least one other node in the plurality of nodes.

2. The method of claim 1, wherein the first message further includes authentication data corresponding to the messaging node, and wherein the second message further includes authentication data corresponding to the first designated recipient node.

3. The method of claim 1, wherein the second designated recipient node includes at least one of: a designated individual recipient, a third designated recipient node, or a third party external to the plurality of nodes.

4. The method of claim 1, wherein the first designated recipient node is autonomously selected based, at least in part, on a type of the event occurrence.

5. The method of claim 1, wherein the second message further includes data provided by the first designated recipient node.

6. The method of claim 1, wherein the data indicative of the event occurrence includes data from one or more media files.

7. The method of claim 1, wherein selectively transmitting the second message to the second designated recipient node includes transmitting the second message via a BLUETOOTH® low energy wireless communication interface.

8. The method of claim 7, wherein the BLUETOOTH® low energy wireless communication interface is a BLUETOOTH® low energy advertising channel.

9. The method of claim 1, wherein the event occurrence proximate the first designated recipient node is an event occurrence geographically proximate to the first designated recipient node.

10. A system for wireless communication, the system comprising:
a processor;
a messaging node included in a plurality of nodes, the messaging node configured to send a first message, the first message including:
data indicative of an event occurrence remote from a first designated recipient node included in the plurality of nodes;
data indicative of a hop count;
data indicative of a maximum number of hops; and
data of at least one designated recipient node;
the first designated recipient node configured to:
receive the first message from the messaging node;
increment the hop count;
determine whether the hop count equals the maximum number of hops by the first recipient node;
in response to a determination that the hop count is less than the maximum number of hops, generate a second message at the first designated recipient node responsive to receipt of the first message, the second message including:
data indicative of the event occurrence received from the messaging node;
data indicative of an incremented hop count;
data indicative of the maximum number of hops; and
data indicative of the at least one designated recipient node;
selectively transmit the second message to a second designated recipient node included in the plurality of nodes;
a sensor communicatively coupled to the first designated recipient node configured to generate a signal that includes data indicative of an event occurrence proximate the first designated recipient node, and wherein the first designated recipient node is further configured to:
generate a message that includes the data indicative of the event occurrence proximate the first designated recipient node; and
selectively transmit the message that includes the data indicative of the event occurrence proximate the first designated recipient node to at least one other node in the plurality of nodes.

11. The system of claim 10, wherein the first message further includes authentication data corresponding to the messaging node, and wherein the second message further includes authentication data corresponding to the first designated recipient node.

12. The system of claim 10, wherein the second designated recipient node includes at least one of: a designated individual recipient, a third designated recipient node, or a third party external to the plurality of nodes.

13. The system of claim 10, wherein the first designated recipient node is autonomously selected based, at least in part, on a type of the event occurrence.

14. The system of claim 10, wherein the data indicative of the event occurrence includes data from one or more media files.

15. the system of claim 10, wherein to selectively transmit the second message to the second designated recipient node includes transmitting the second message via a BLUETOOTH® low energy wireless communication interface.

16. The system of claim 15, wherein the BLUETOOTH® low energy wireless communication interface is a BLUETOOTH® low energy advertising channel.

17. The system of claim 10, wherein the event occurrence proximate the first designated recipient node is an event occurrence geographically proximate to the first designated recipient node.

18. At least one non-transitory machine-readable medium with instructions stored thereon, which, when executed by at least one processor of a computing system, cause the at least one processor to:
receive a first message from a messaging node included in a plurality of nodes at a first designated recipient node included in the plurality of nodes, the first message including:
data indicative of an event occurrence remote from the first designated recipient node;
data indicative of a hop count;
data indicative of a maximum number of hops; and
data of at least one designated recipient node;

increment the hop count by the first designated recipient node;
determine whether the hop count equals the maximum number of hops by the first recipient node;
in response to a determination that the hop count is less than the maximum number of hops, generating a second message at the first designated recipient node responsive to receipt of the first message, the second message including:
data indicative of the event occurrence received from the messaging node;
data indicative of an incremented hop count;
data indicative of the maximum number of hops; and
data indicative of the at least one designated recipient node;
selectively transmit the second message to a second designated recipient node included in the plurality of nodes;
generate via a sensor communicatively coupled to the first designated recipient node, a signal that includes data indicative of an event occurrence proximate the first designated recipient node;
generate, at the first designated recipient node, a message that includes the data indicative of the event occurrence proximate the first designated recipient node; and
selectively transmit the message to at least one other node in the plurality of nodes.

19. The at least one non-transitory machine-readable medium of claim 18, wherein the first message further includes authentication data corresponding to the messaging node, and wherein the second message further includes authentication data corresponding to the first designated recipient node.

20. The at least one non-transitory machine-readable medium of claim 18, wherein the second designated recipient node includes at least one of: a designated individual recipient, a third designated recipient node, or a third party external to the plurality of nodes.

21. The at least one non-transitory machine-readable medium of claim 18, wherein the first designated recipient node is autonomously selected based, at least in part, on a type of the event occurrence.

22. The at least one non-transitory machine-readable medium of claim 18, wherein to selectively transmit the second message to the second designated recipient node includes transmitting the second message via a BLUETOOTH® low energy wireless communication interface.

23. The at least one non-transitory machine-readable medium of claim 22, wherein the BLUETOOTH® low energy wireless communication interface is a BLUETOOTH® low energy advertising channel.

24. The at least one non-transitory machine-readable medium of claim 18, wherein the event occurrence proximate the first designated recipient node is an event occurrence geographically proximate to the first designated recipient node.

* * * * *